United States Patent [19]

Ohtake et al.

[11] 4,199,820
[45] Apr. 22, 1980

[54] RANDOM ACCESS STORAGE APPARATUS WITH A MOVABLE RECORDING MEDIUM

[75] Inventors: Masatoshi Ohtake, Hachioji; Takeshi Maeda, Kokubunji; Morishi Izumita, Inagi, all of Japan

[73] Assignee: Hitachi, Ltd., Japan

[21] Appl. No.: 970,331

[22] Filed: Dec. 18, 1978

[30] Foreign Application Priority Data

Dec. 16, 1977 [JP] Japan .................. 52-150534

[51] Int. Cl.² .............. G11C 8/00; G11C 13/04; G11B 7/00
[52] U.S. Cl. .................. 365/234; 358/128.5; 360/78; 179/100.3 V
[58] Field of Search .............. 365/234; 358/128; 360/78; 179/100.3 D, 100.3 V, 100.4 D

[56] References Cited

U.S. PATENT DOCUMENTS

| | | | |
|---|---|---|---|
| 3,085,230 | 4/1963 | Shoultes et al. | 360/78 |
| 3,812,533 | 5/1974 | Kimura et al. | 360/78 |
| 4,138,663 | 2/1979 | Lehureau et al. | 365/234 |
| 4,142,209 | 2/1979 | Hedlund et al. | 365/234 |

*Primary Examiner*—Stuart N. Hecker
*Attorney, Agent, or Firm*—Craig and Antonelli

[57] ABSTRACT

In a storage apparatus wherein signals recorded on tracks assigned addresses in advance on a rotary recording medium such as an optical video disk are randomly searched at high speed, a random access storage apparatus is provided in which erroneous searches attributed to a transient phenomenon due to a jump for the search, a drop-out, etc. are prevented.

The storage apparatus includes an error check circuit. In a random access operation, a read head is mechanically moved to the vicinity of a target address, whereupon an address signal of a track to which the head has been moved is read. Whether or not the address signal is normal is determined by the error check circuit. If the address signal is determined to be normal, it is stored in a register as a reference address. A light spot is deflected by the number of tracks which corresponds to the address difference between the reference address of the register and the target address.

If the address signal is determined to be abnormal, the light spot is unconditionally deflected onto the adjacent track and an address signal is read out at the new position of deflection. Thereafter, the error decision and the subsequent operation described above are carried out.

7 Claims, 26 Drawing Figures

FIG. 1
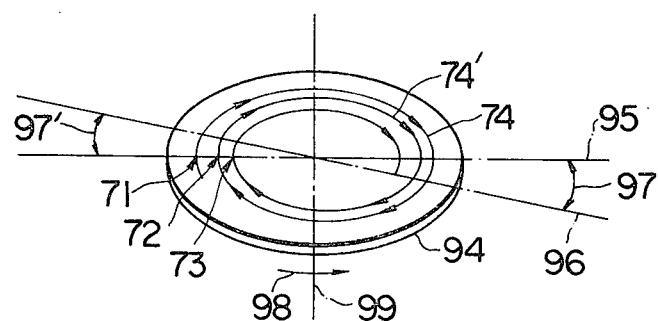
FIG. 2
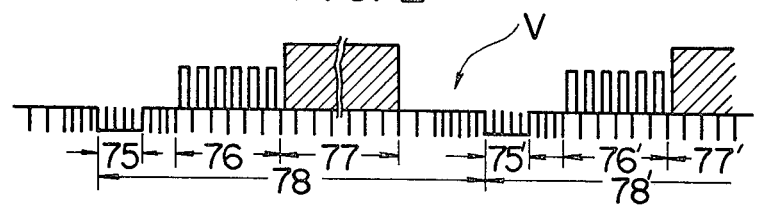
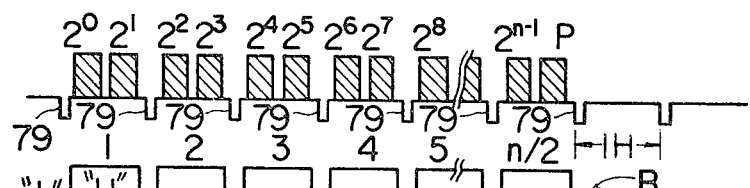
FIG. 3A
FIG. 3B
FIG. 3C
FIG. 3D
FIG. 3E
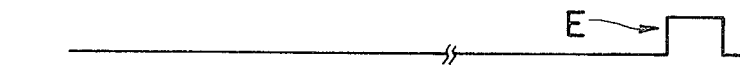

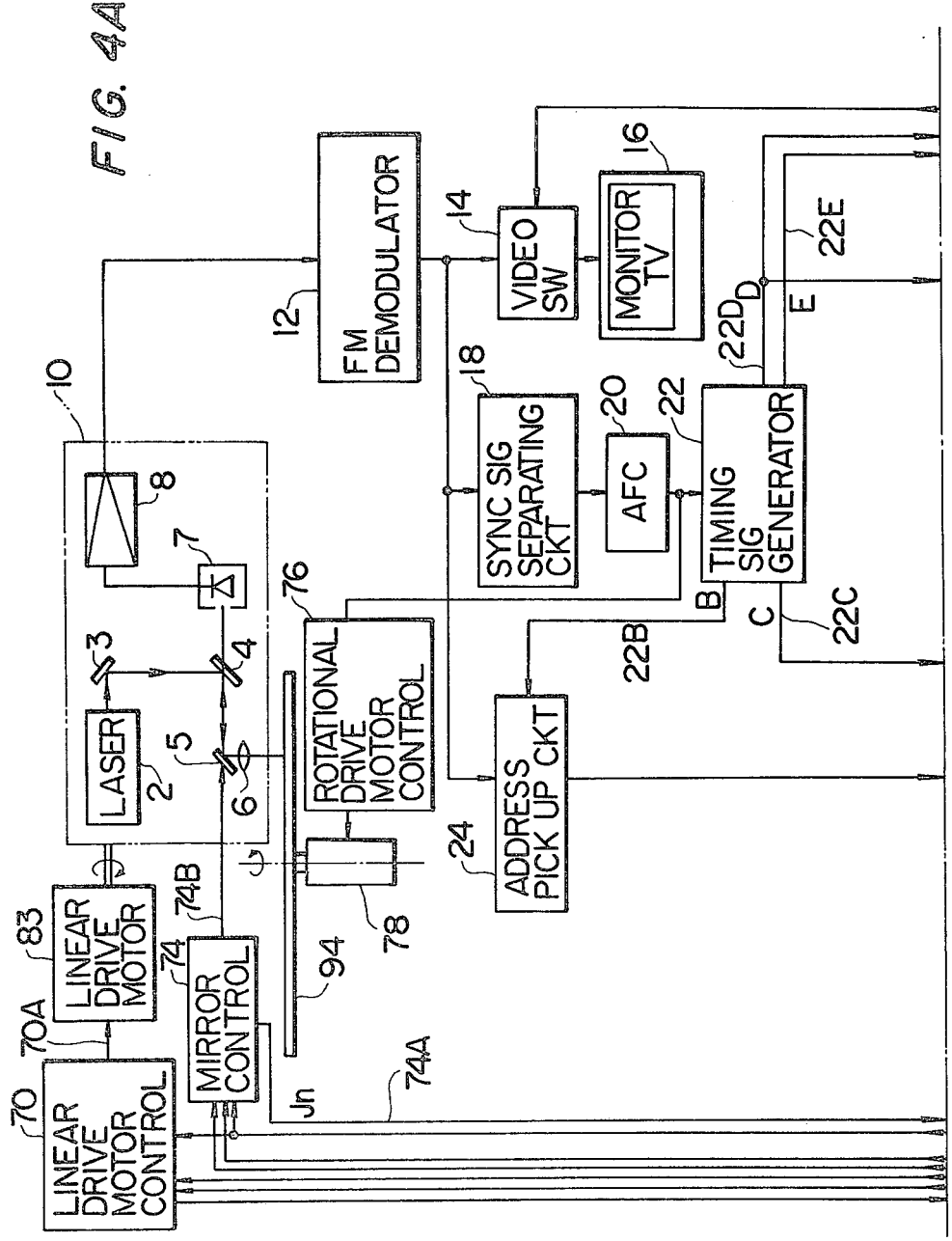

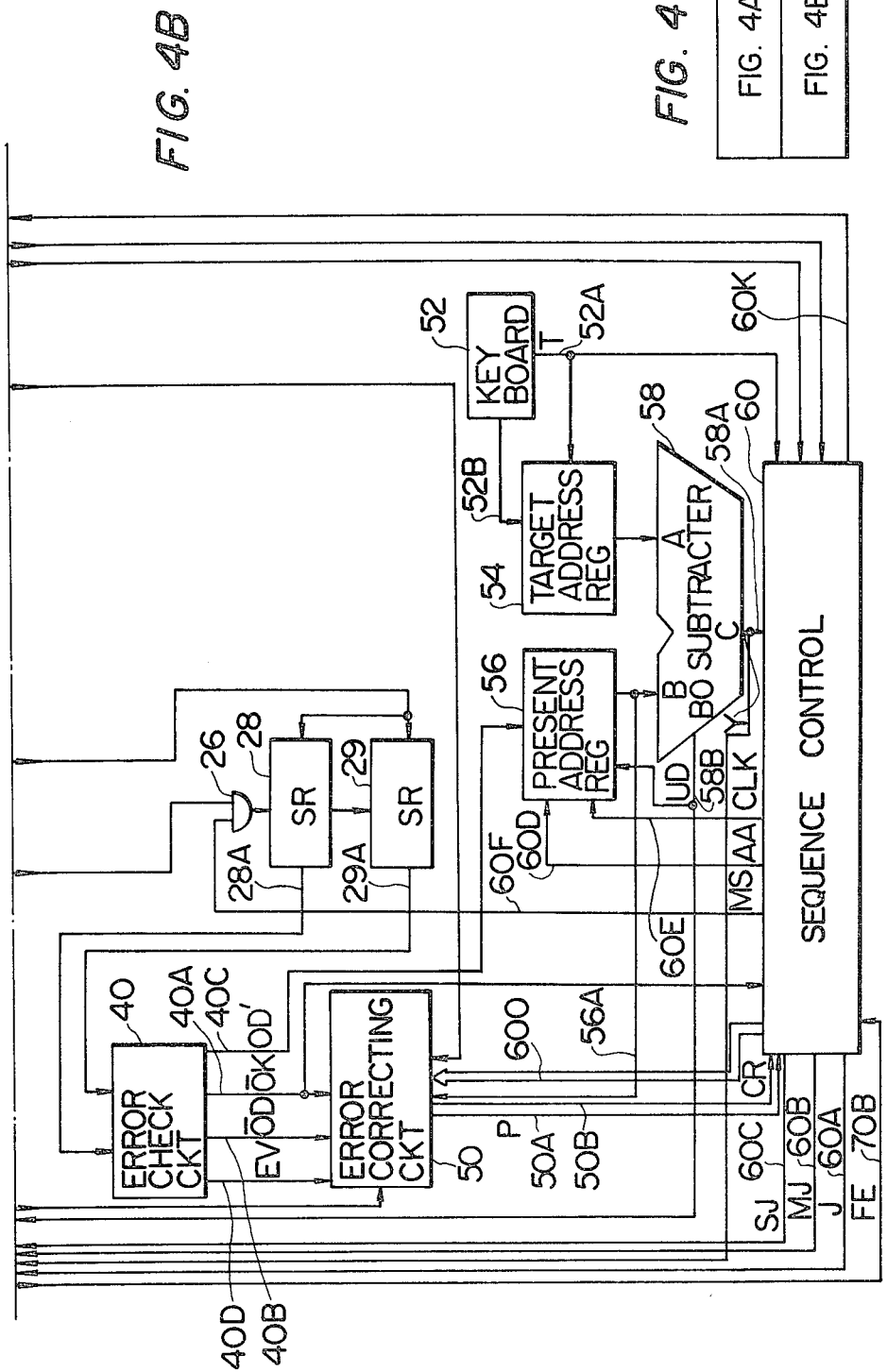

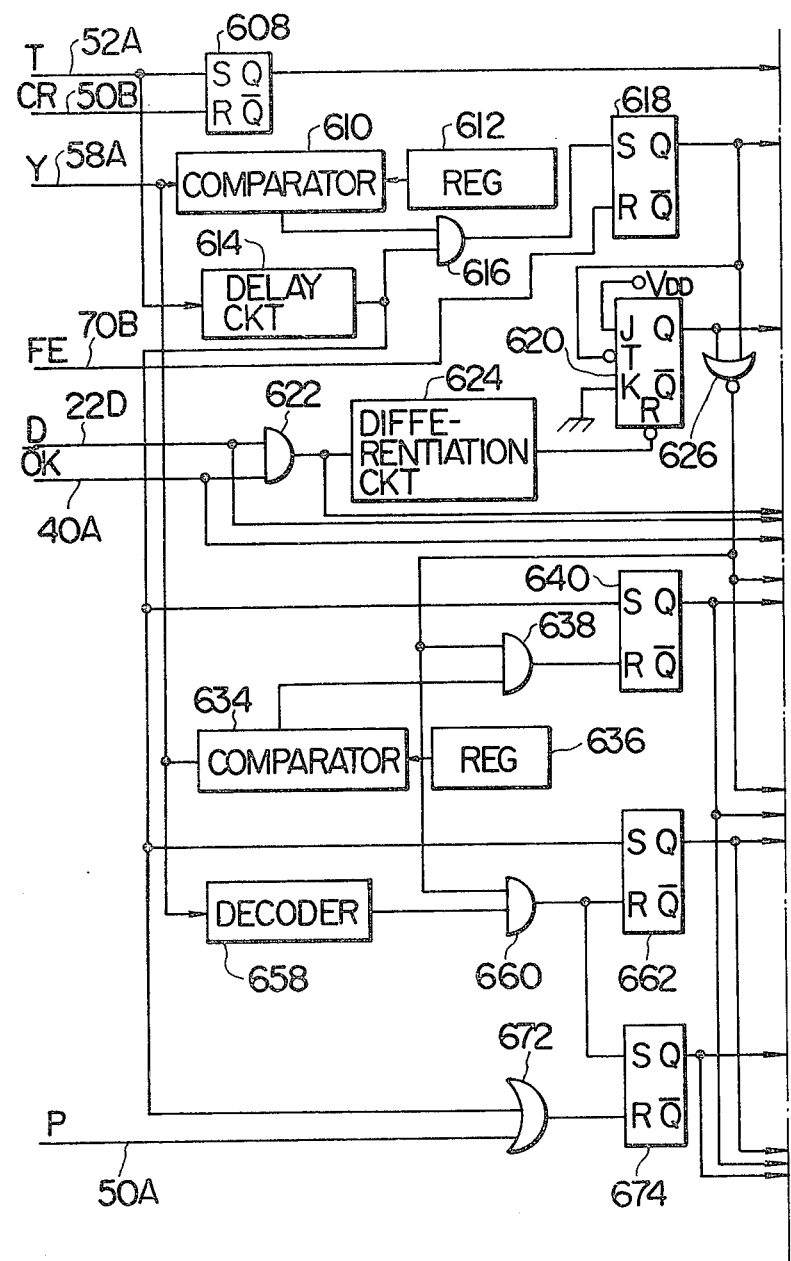

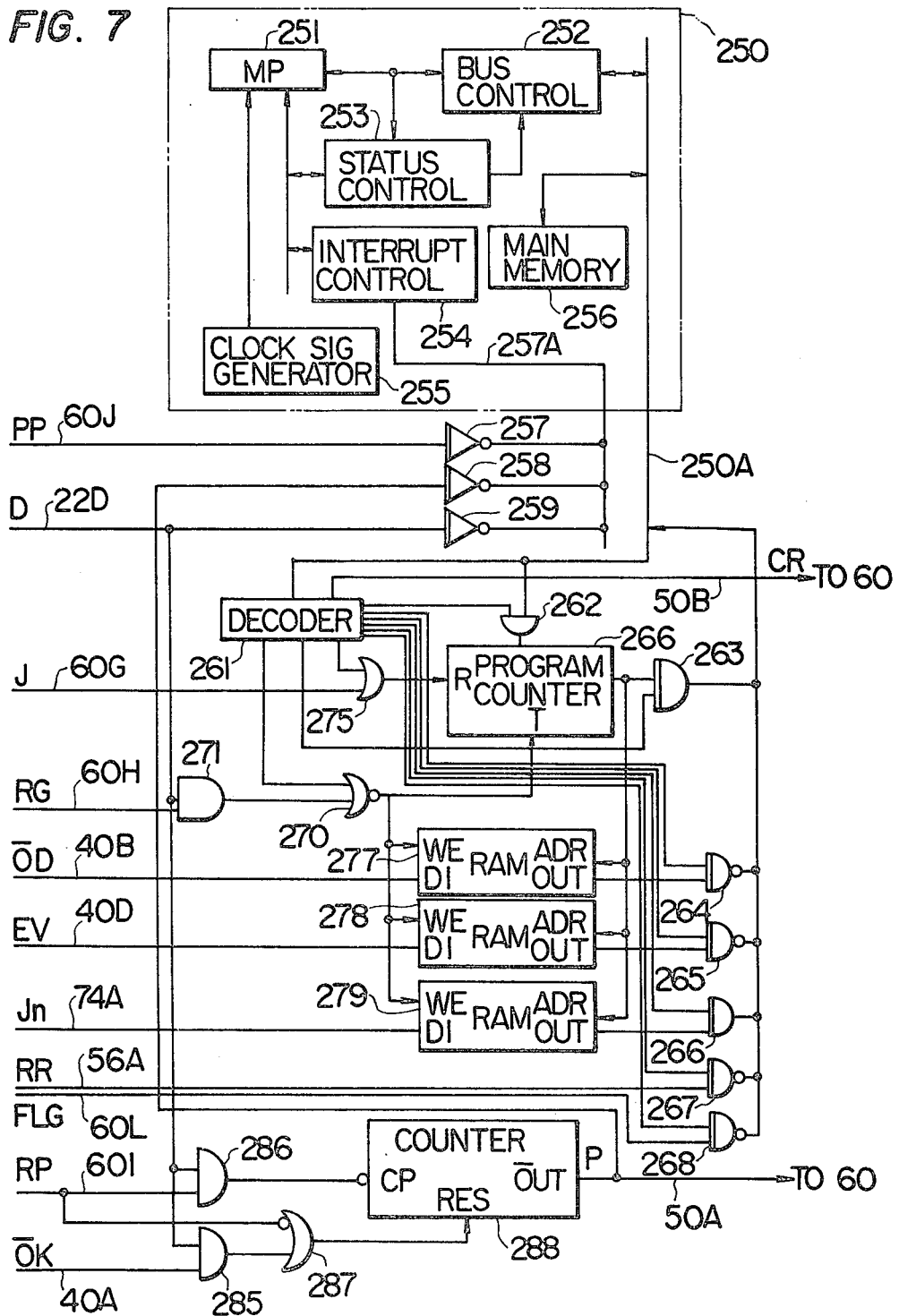

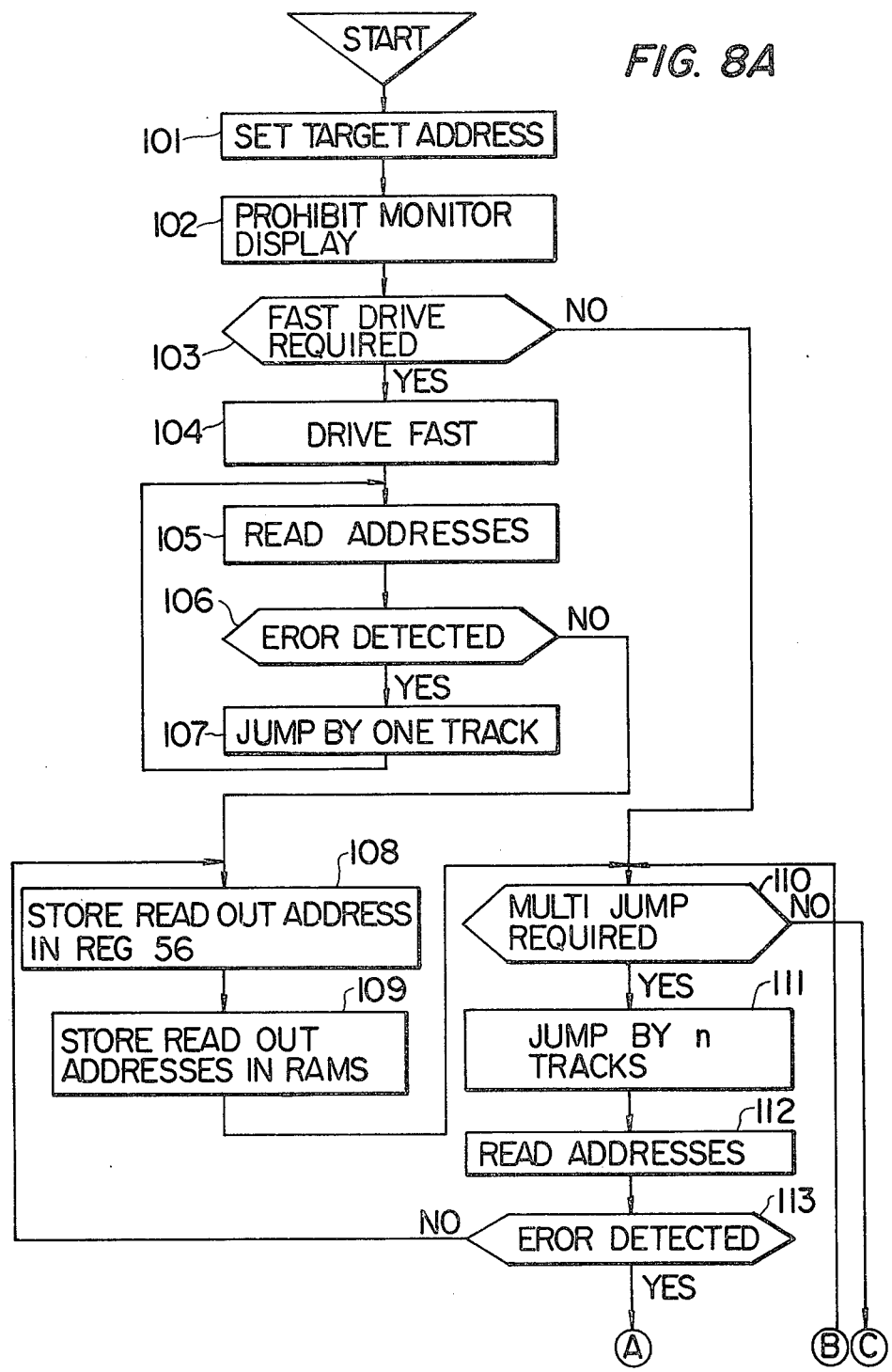

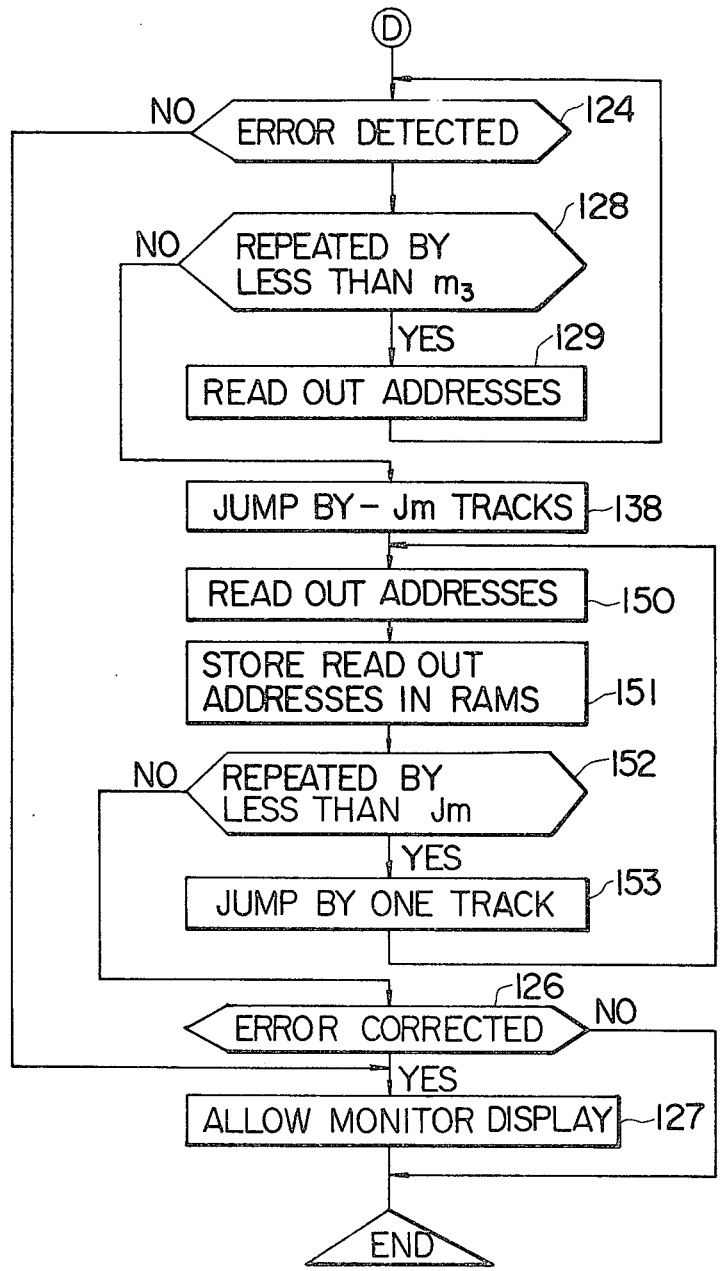

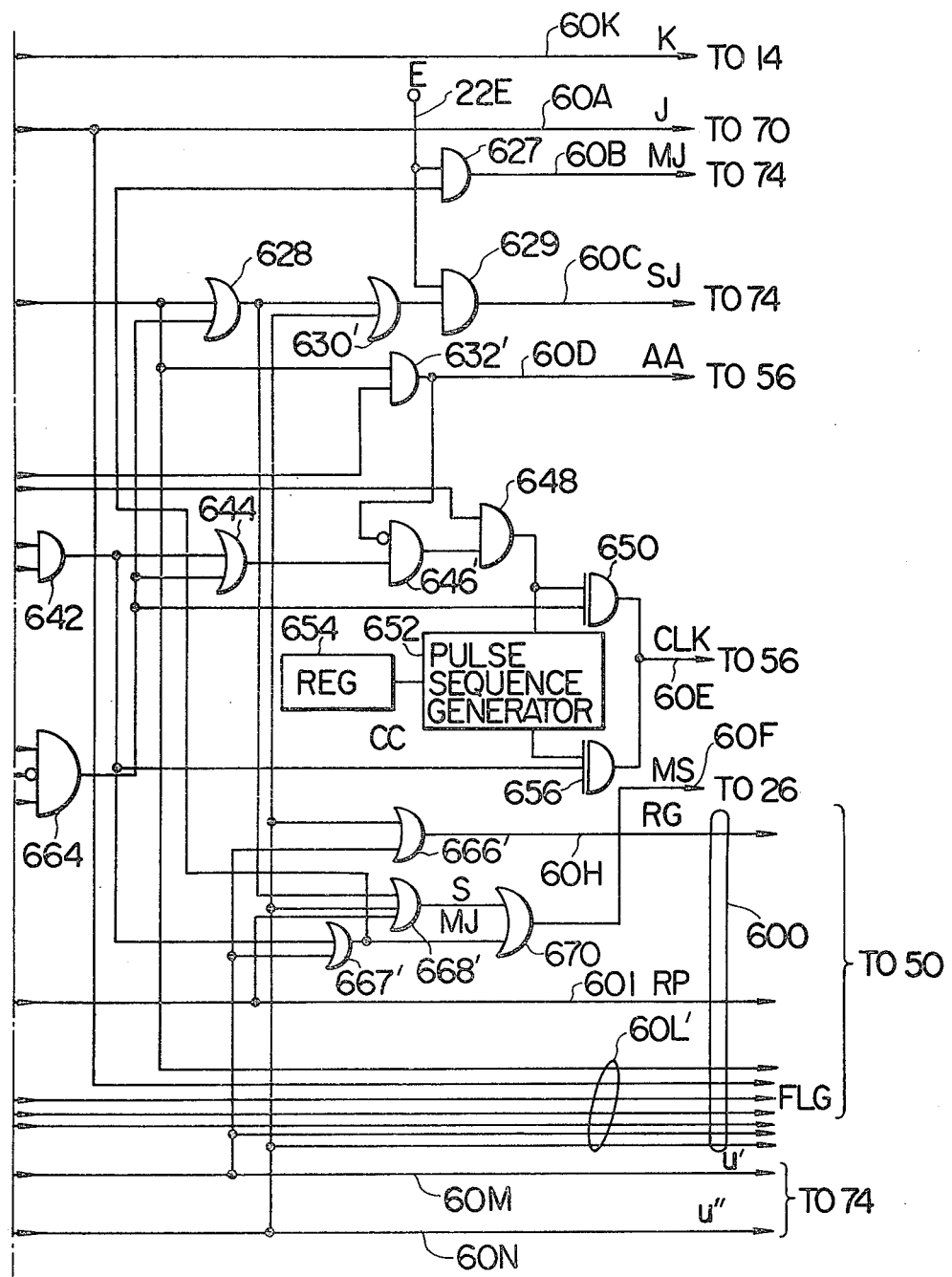

RANDOM ACCESS STORAGE APPARATUS WITH A MOVABLE RECORDING MEDIUM

BACKGROUND OF THE INVENTION

This invention relates to a storage apparatus which has a rotatable recording medium and which is randomly accessible to one of a plurality of signal recording tracks formed on the medium.

More particularly, this invention relates to a storage apparatus which can read out from one of a plurality of tracks recorded on a rotary disk, video signals stored therein.

More specifically, this invention relates to a storage apparatus where, even in a case when a track address information stored in each of a plurality of tracks for random access has been read out and an error has been detected in the track address signal read out, it is possible to detect a predetermined target track and to read out a signal therefrom.

In a prior-art video information file employing a magnetic disk, the track interval is wide (approximately 500 μm), and the high-speed search of any desired address is obtained merely by detecting a mechanical position.

In an optical video disk device wherein video information are played back with a light beam, there is known a technique for searching for a desired one of a plurality of tracks on a disk at high speed as described in Japanese Published Unexamined Patent Application No. 51-21727.

This technique is characterized in that a large number of tracks are recorded on the rotary recording member and that one of the tracks is selected so as to play back video information contained in the particular track. An access system is adopted wherein address signals for selecting the tracks are recorded in the respective tracks in advance, a determination is made as to whether or not the address signal read out from one track in the vicinity of a target address is the predetermined target address and the track of the predetermined target address is determined on the basis of the determination as detection result. Accordingly, unless the address signal read out is correct, a track of an address of a very different value will be mistaken as the target track and played back. Since information are recorded at a very high density in the actual recording, it is often the case that errors of the address signals develop due to transient phenomena, drop-out etc. in reading out the addresses. It is therefore difficult to precisely select any tracks at random.

A technique for coping with such errors of address signals is described in Japanese Published Unexamined Patent Application No. 52-114305. This patent application has been filed claiming the priority based on British Patent Application Ser. No. 11119/76.

In the specification of such application, a technique is described wherein address signals are provided in a plurality of places within each track is advance, the plurality of address signals are read out for determining whether or not a certain track is a predetermined target track, and majority logic is applied to the plurality of address signals read out, so as to select the correct address.

However, if the address signals include errors, it is sometimes the case that the correct address cannot be uniquely determined by the majority logic. Accordingly, even the technique of this application cannot perfectly cope with the errors of the address signals.

List of Prior Arts (37 CFR 1. 56 (a))

The following references are cited to show the state of the art:

Japanese Published Unexamined Patent Applications No. 51-21727 and No. 52-114305.

SUMMARY OF THE INVENTION

An object of this invention is to provide a random access storage apparatus in which signals recorded in tracks assigned addresses in advance on a rotary recording medium such as an optical video disk are searched for at high speed and in which erroneous searches attributed to a transient phenomenon due to a jump for the search, a drop-out, etc. are prevented.

The apparatus of this invention includes an error check circuit. In a random access operation, a read head is mechanically moved to the vicinity of a target address, whereupon an address signal of a track to which the head has moved is read. An error check circuit is utilized to determine whether or not the address signal is a normal one. If the address signal is determined to be normal, it is stored into a register as a reference address.

A light spot is deflected by the number of tracks which corresponds to the address difference between the reference address of the register and the target address. If the address signal is determined to be abnormal, the light spot is unconditionally deflected onto the adjacent track. An address signal is read out at the new position of deflection again. Thereafter, the error decision and the subsequent operation above described are carried out.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 illustrates video signal tracks recorded on a rotary disk,

FIG. 2 illustrates the principal parts of a demodulated waveform of video signals within one track in a model-like fashion, FIGS. 3A to 3E are diagrams showing various signals for use in an embodiment of this invention, FIGS. 4A and 4B are schematic block diagrams of a first embodiment of this invention, and FIG. 4C is a diagram showing the manner of arranging, the parts in FIGS. 4A and 4B, FIGS. 5A and 5B are schematic circuit diagram of a sequence control in FIG. 4B, FIG. 7 is a schematic block diagram of an error correcting circuit in FIG. 4B, FIGS. 8A and 8C are flow charts showing the flow of operations of the first embodiment, FIGS. 12A and 12B are schematic circuit diagrams of a sequence control for use in the second embodiment and FIG. 12C is a diagram showing the manner of arranging the parts in FIGS. 12A and 12B.

DETAILED DESCRIPTION OF THE PREFERRED EMBODIMENTS

Figure 5B:
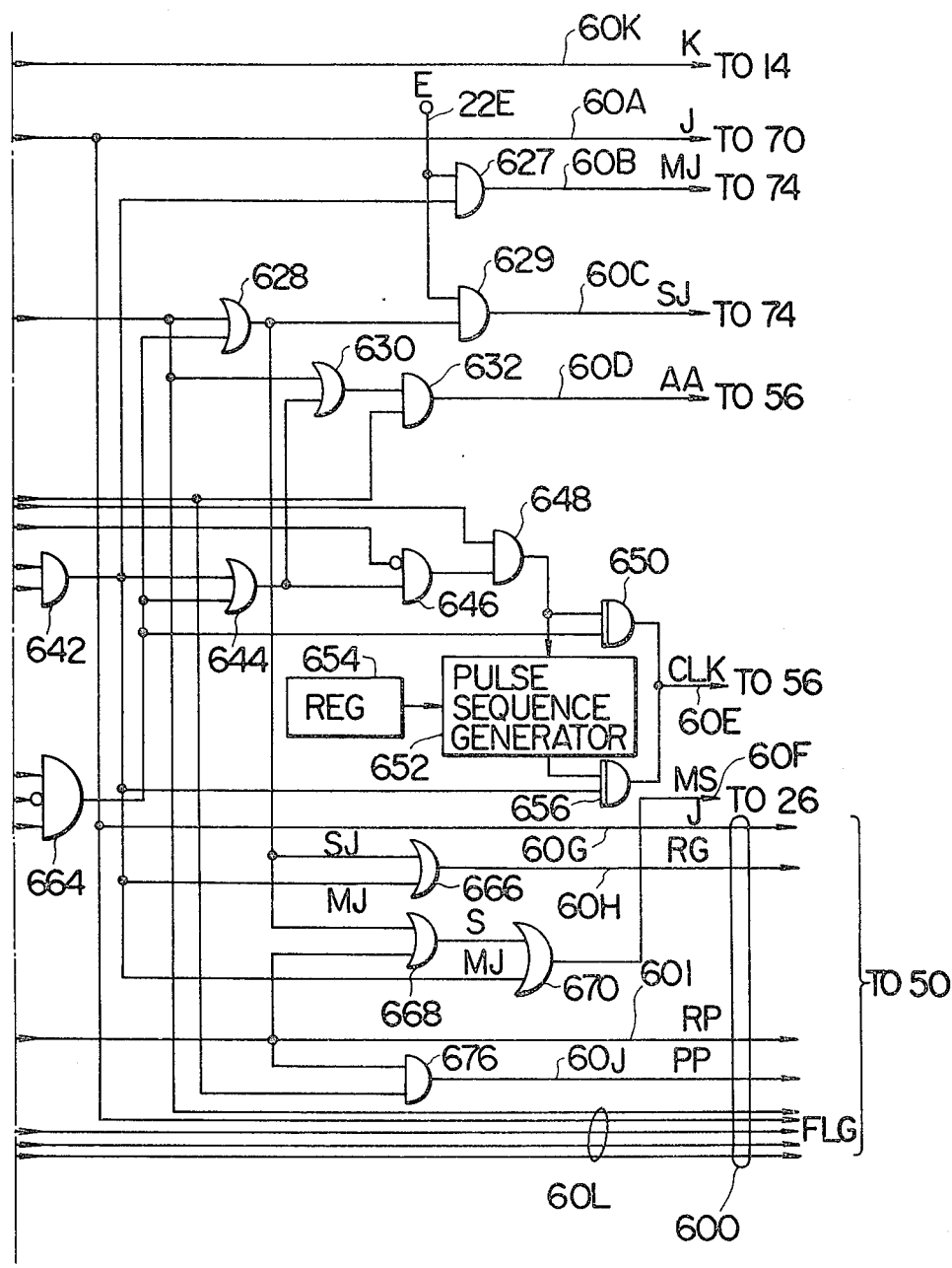
FIG. 5C is a diagram showing the manner of arranging, the parts in FIGS. 5A and 5B.

Referring to FIG. 1, a disk 94 rotates in the direction of arrow 98 about an axis 99 at 1,800 revolutions per minute. Frequency-modulated signals which correspond to one frame or two fields conforming with the NTSC format are read out from one of the continuous signal recording tracks during one revolution of the disk. In the signal recording tracks, signals are recorded in the form of, for example, the magnitudes of concave and convex portions of the surface of the disk. The tracks are formed to be spiral towards the center of the disk. In the track for each frame, the address of the particular frame is recorded. The interval of the adjacent tracks is 2 $\mu$m. Assuming that a track 74 formed in the video disk 94 and extending from a point 71 to a point 72 is of address K, a track 74' lying inside the track 74 and extending from the point 72 to a point 73 becomes the address (K+1). In the respective tracks, the addresses K and (K+1) are recorded as an odd field address and an even field address at parts within two regions 97 and 97' which are enclosed with two diameters of the disk. This is done for the error check and the error correction to be described later.

In FIG. 2, assuming 78 denote an odd field period of video signals V and 78' denote an even field period thereof, then numeral 75 indicates a vertical synchronizing pulse period of the odd field, numeral 76 an address signal period thereof, and numeral 77 a video signal period thereof. Symbols 75', 76' and 77' indicate periods for various signals in the even field, and the respective periods correspond to the periods 75, 76 and 77 in the odd field. FIG. 3A is an enlarged diagram of the signals V showing the odd field address signal period 76 in FIG. 2. An address signal is a signal of (n+1) bits which consist of n address bits and one parity bit. In a horizontal scanning period which lies between adjacent horizontal synchronizing pulses 79, signals of two of the (n+1) bits are included. In the figure, $2^0$, $2^1$, ... and $n^{n-1}$ represents the first to n-th address bits, respectively, and P represents the parity bit. In the even field address signal period 76', an address signal is included quite similarly. In addition, this address signal serves to indicate the same address as that of the address signal contained in the even field address signal period 76.

Hereunder, the construction and operation of a device in FIGS. 4A and 4B will be described according to a flow of FIGS. 8A, 8B and 8C and with reference to FIGS. 5A, 5B, 6, 7, 9 and 10.

After closure of a power supply of this device, a target address is sent towards a target address register 54 through a line 52B by a keyboard 52. Further, a start signal T is transmitted from the keyboard 52 through a line 52A to the register 54. Thus, the target address is set in the target address register 54 (FIG. 8A, block 101). At this time, the start signal T is simultaneously sent to a sequence control 60 so as to inform it of the initiation of a search operation. An R-S flip-flop 608 (FIG. 5A) within the sequence control 60 is set by the signal T. A high level output K of the flip-flop 608 turns "off" a video switch 14 through a line 60K. Thus, the monitor display is prohibited (FIG. 8A, block 102).

An output of the target address register 54 and an output of a present address register 56 are respectively supplied to terminals A and B of a subtractor 58, in which the difference of both the outputs is calculated. In consequence of the subtraction, the absolute value Y of the difference is delivered from a terminal C onto a line 58A, and the sign UD of the difference is delivered from a borrow terminal BO onto a line 58B. Before the initiation of a random access, the present address register 56 stores therein the address of a track which a read head 10 can presently read out, or an address predicted to be the address of the track.

As shown in FIG. 5A, the sequence control 60 compares the magnitude of the difference signal Y with a value $m_2$ stored in a register 612 by means of a comparator 610. The value of $m_2$ is selected to, for example, 32. Depending on whether the difference signal Y is at least equal to $m_2$ or is smaller than $m_2$, a signal of a high level or a low level is provided from the comparator 610. The signal is sent to an AND gate 616. The AND gate 616 also receives the start signal T as delayed by a delay circuit 614. The delay circuit 614 delays the start signal T so that the signal T may be delivered to the AND gate 616 after the result of the comparison between the difference signal Y and the value $m_2$ has been provided from the comparator 610. An output of the AND gate 616 is entered into the set terminal of a flip-flop 618. Accordingly, the flip-flop 618 is set when Y<$m_2$, and it is not set when Y<$m_2$. Checking whether or not Y is at least $m_2$, is carried out in order to determine whether or not the read head 10 is to be driven at a high speed by a motor 83. Accordingly, an output J of the flip-flop 618 indicates the result of a test as to the necessity for a high speed drive of the motor (FIG. 8A, block 103).

When the flip-flop 618 is set to transmit the high speed drive signal J, a high speed or drive operation (FIG. 8A, block 104) is performed as stated below.

The high level output J of the flip-flop 618 is sent from the sequence control 60 through a line 60A to a linear drive motor control 70 shown in FIG. 4A. On the other hand, the difference signal Y and the sign signal UD are respectively entered from the subtracter 58 into the linear drive motor control 70 through the lines 58A and 58B. Upon receiving these signals, the linear drive motor control 70 transmits a signal to the motor 83 through a line 70A, the signal serving to move the read head 10 in a moving direction indicated by the sign signal UD a distance which corresponds to the address difference indicated by the difference signal Y. The motor 83 rotates in response to this signal, with the result that the read head 10 is moved the predetermined amount.

The read head 10 is composed of a laser 2; a mirror 3, a beam splitter 4 and a mirror 5 which reflect a beam from the laser; a focusing lens 6; a photocell 7; and an amplifier 8. These components are mechanically fixed to one another, and are all moved in parallel with the surface of the disk 94 by the motor 83.

The motor 83 effects the predetermined rotation, with the result that the read head 10 is moved to the vicinity of the track of the target address. Then, the linear drive motor control 70 transmits a signal FE indicative of the end of the high speed drive to the sequence control 60 through a line 70B. The signal FE is entered into the reset terminal (R) of the flip-flop 618.

The flip-flop 618 is accordingly put into a reset state by the signal FE.

The output J of the flip-flop 618 is inverted and then entered into the trigger terminal (T) of a flip-flop 620. Accordingly, the flip-flop 620 is set when the flip-flop 618 has been reset. Therefore, the flip-flop 620 provides a signal indicating that the high speed drive operation has ended. The high speed drive signal J is simultaneously sent to an error correcting circuit 50 through a line 60G so as to inform the error correcting circuit of the proceeding of the high speed drive.

After the high speed drive, an address reading operation (FIG. 8A, block 105) is conducted as follows. Light reflected from the disk 94 is detected by the photocell 7 through the mirror 5 as well as the beam splitter 4, and the detected signal is amplified by the amplifier 8. At this time, the deviation between the position of a beam spot thrown on the disk 94 and the position of the track is detected by a known tracking device not shown in FIGS. 4A and 4B. The deviation signal is sent to a mirror control 74 to control the deflection angle of the mirror 5, whereby the position of the beam spot and the position of the track are brought into agreement (that is, tracking is effected). The FM wave amplified by the amplifier 8 is demodulated by the FM demodulator 12 into the video signals V of the NTSC format (FIG. 2). The video signals V are distributed to a synchronizing signal separator circuit 18, an address signal pickup circuit 24, and the video switch 14 for the monitor display. Horizontal synchronizing pulses and vertical synchronizing pulses are separated from the video signals V by the synchronizing signal separator circuit 18. These pulses are subjected to a frequency control and have drop-out components and the like noise eliminated therefrom by means of an automatic frequency control circuit 20 which includes s noise limiter. Thereafter, they are entered into a timing signal generator 22 and a rotational drive motor control 76. The rotational drive motor control 76 drives a rotational motor 78 at 1,800 r.p.m. while comparing the entered horizontal synchronizing pulses and vertical synchronizing pulses with reference pulses which are generated by a crystal oscillator contained in the control 76.

In response to the horizontal and vertical synchronizing pulses, the timing signal generator 22 generates timing signals B, C and D for reading address information as respectively shown in FIGS. 3B, 3C and 3D and a signal E for controlling the timing of a jump of the mirror 5 as shown in FIG. 3E.

The timing signal B is a timing signal for picking up only the address bits from the signals V, while the timing signal C is a timing signal for reading the address signal picked up. Further, the timing signal D is produced only in case of the even field, and its leading edge 80 determines the decision timing of the read result of the address signal, while its trailing edge 81 determines the timing for executing the decision, the detailed description thereof being presented below 7. On the other hand, the address signal pickup circuit 24 picks up only the address signal from the video signals by the use of the timing signal B entered through a line 22B from the timing signal generator 22, and it enters the address signal into the data input terminal of a shift register 28 having a capacity of (n+1) bits through the medium of an AND gate 26. The AND gate 26 is controlled by a signal MS on a line 60F from the sequence control 60, and is enabled at the time when the read head has been moved to the vicinity of the target address by the linear drive motor 83 and when the address information is to be read. The shift register 28 loads the (n+1) bits of the address signal bit by bit in succession, using as a shift clock signal the timing signal C entered from the timing signal generator 22 through a line 22C into the clock terminal thereof. Thus, the odd field address is first stored into the shift register 28. In reading the even field address subsequent to the odd field, the odd field address signal already stored is entered from the shift register 28 into a shift register 29, similarly having a capacity of (n+1) bits, every bit in response to the timing signal C. Using as shift clocks the timing signal C entered through the line 22C, the shift register 29 stores every bit of this input signal. Meanwhile, the shift register 28 stores the even field address anew in parallel with the storing operation of the shift register 29. Thus, the addresses of the even and odd fields for one frame in the vicinity of the target address are stored in the shift registers 28 and 29. In this way, the address reading operation (FIG. 8A, block 105) is carried out. Subsequently, the contents of the shift registers 28 and 29 are respectively entered into an error check circuit 40 through lines 28A and 29A so as to determine the presence or absence of any error (FIG. 8A, block 106).

Figure 6:
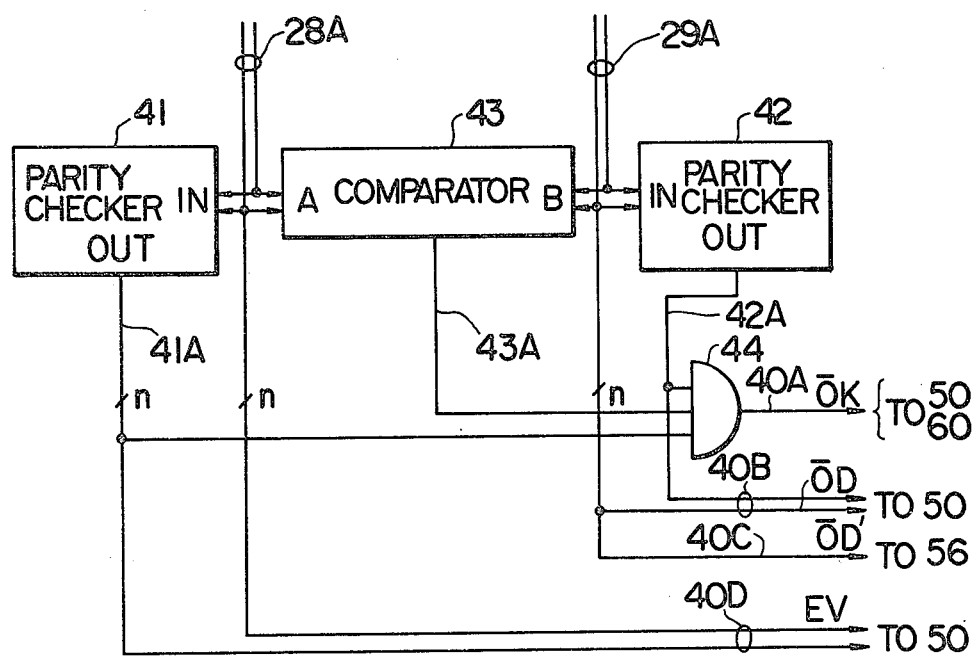
FIG. 6 is a schematic block diagram of an error check circuit in FIG. 4B.

FIG. 6 shows the details of the error check circuit 40. A comparator 43 compares the even field address signal and the odd field address signal which are respectively entered therein through the lines 28A and 29A from the shift registers 28 and 29. When the signals are coincident, the comparator delivers a coincidence signal of high level onto a line 43A. Parity checkers 41 and 42 carry out the parity checks of the even field address signal and odd field address signal and deliver the results onto lines 41A and 42A, respectively. More specifically, depending upon whether the number of bits being "1" among the (n+1) bits of each address signal is odd or even, the corresponding circuit 41 or 42 provides a signal of high level or low level for indicating the presence or absence of a parity error. A signal OK is provided on an output line 40A of an AND gate 44, which signal becomes the high level only when the even field address signal and the odd field address signal are coincident with each other and additionally both have no parity error. The signal OK is sent through the line 40A to the error correcting circuit 50 and the sequence control 60 in FIG. 4B. The signals on the output lines 41A and 42A of the parity checkers 41 and 42 and the even and odd field address bits (n bits excluding the parity bit) on the lines 28A and 29A are sent through lines 40D and 40B to the error correcting circuit 50 in FIG. 4B as even and odd field data EV and $\overline{OD}$, respectively. The odd field address bits (n bits) on the line 29A are sent through a line 40C to the present address register 56 in FIG. 4B as a signal $\overline{OD}'$.

Thus, the error checking operation (FIG. 8A, block 106) ends. In a case where the presence of an error has been determined as the result of the error check, there is a shift to a one-track jump operation (FIG. 8A, block 107). This operation is processed as described below in the sequence control 60 (FIGS. 5A and 5B). The signal OK is not delivered, so that an AND gate 622 is not enabled. Accordingly, the flip-flop 620 having been set after the end of the fast drive is not reset. The output of the flip-flop 620 is entered into an AND gate 629 through an OR gate 628. Under this state, the AND gate 629 is turned "on" by the pulse E which is provided from the timing pulse generator 22 (FIG. 4A) and supplied through a line 22E with a delay of approximately one horizontal scanning period relative to the signal D. Then, a signal of high level SJ is sent to the mirror control 74 (FIG. 4A) through a line 60C. Upon receiving this signal, the mirror control 74 delivers onto a line 74B a signal which controls the deflection angle of the mirror 5 so that the beem spot may move by one track unconditionally.

Thus, the one-track jump operation (FIG. 8A, block 107) ends. The address reading operation of the block 105 (FIG. 8A) is carried out again. In a case where the absence of an error has been determined judged as the result of the address reading operation, an operation (FIG. 8A, block 108) of storing the read address into the present address register 56 (FIG. 4B) is effected as follows by means of the sequence control 60 shown in FIGS. 5A and 5B. In the state in which the signal $\overline{OK}$ of the high level is delivered onto the line 40A by the error check circuit 40, the pulse D is entered into the AND gate 622 within the sequence control 60, and this gate is enabled. The pulse D is entered into the reset terminal R of the flip-flop 620 through a differentiation circuit 624 and after being inverted. In consequence, the flip-flop 620 is reset at the trailing edge 81 of the pulse D. The output of the flip-flop 620 is entered into an AND gate 632 through an OR gate 630, while the output of the AND gate 622 is directly entered into the same.

As a result, a signal AA of high level is provided from the AND gate 632 only while the pulse D is at the high level. Moreover, once the signal AA has been provided, the flip-flop 620 is thereafter reset, so that the signal is not delivered thenceforth.

The signal AA is sent to the present address register 56 (FIG. 4B) through a line 60D. Upon receiving the signal AA, the register 56 stores the read address signal $\overline{OD}'$ which is entered through the line 40C. In this way, the operation of storing the read address into the register 56 (FIG. 8A, block 108) is completed.

Substantially in parallel with this operation, an operation (FIG. 8A, block 109) of storing the read addresses into correcting memories in the error correcting circuit 50 is carried out. A signal SJ of high level from the flip-flop 620 is sent onto a line 60H through the OR gate 628 as well as an OR gate 666. A signal RG on the line 60H is sent to the error correcting circuit 50, and instructs the correcting memories in the circuit to store the read address signals EV and $\overline{OD}$. The operation of the error correcting circuit 50 at this time will be explained below.

Assume a case where, as the result of the test on the necessity for the fast or high speed drive in the block 103 of FIG. 8A, it has been determined that $Y < m_2$ and that the fast drive is unnecessary, or assume a case where the operation of the block 109 has ended and, a test of block 110 is executed. In the former case, the flip-flop 618 is not set and it remains reset. Accordingly, the fast drive signal J is not delivered. The flip-flop 620 remains reset because no trigger signal is entered. After the completion of the operation of the block 109 in FIG. 8A, the flip-flops 618 and 620 are in the reset state. In this state, a test on the necessity for a multi-jump in the block 110 of FIG. 8A is carried out in the sequence control 60 in such a way that a determination of whether or not the difference signal Y is greater than a predetermined value is made as is described below.

A flip-flop 640 is set by the start signal T which is given through the delay circuit 614. The difference signal Y entered from the subtractor 58 (FIG. 4B) is compared with the value $m_1$ stored in a register 636, in a comparator 634 within the control 60. This value $m_1$ can be selected to any value of e.g. 2 to 8, and is assumed to be 3 here by way of example.

The comparator 634 provides a signal of high level when Y is smaller than $m_1$. When the flip-flops 618 and 620 are in the reset state, the signal of high level from the flip-flop 620 is entered into an AND gate 638 through a NOR gate 626, and it causes the AND gate 638 to provide a signal of high level together with the high level signal entered from the comparator 634. As a result, the flip-flop 640 is reset. On the other hand, the comparator 634 does not provide the high level signal when Y is equal to or greater than $m_1$. Accordingly, the flip-flop 640 is not reset. The flip-flop indicates the result of the comparison between Y and $m_1$, that is, whether or not the multi-jump is necessary. Thus, the operation of the block 110 in FIG. 8A is completed.

When $Y > m_1$, the multi-jump is executed (FIG. 8A, block 111). That is, the deflection angle of the mirror 5 is changed by $+n$ or $-n$ tracks by means of the mirror control 74. A control therefor is carried out as follows. When both the flip-flops 618 and 620 are in the reset state, the NOR gate 626 provides a signal of high level. Since, on the other hand, the flip-flop 640 is in the set state, a gate 642 is in the "on" state. When the signal E is entered into an AND gate 627 through the line 22E from the timing signal generator 22, a high level signal of the AND gate 642 is entered into the mirror control 74 (FIG. 4A) through a line 60B as a signal MJ for instructing the multi-jump. In response to this signal MJ and the sign signal UD entered through the line 58B from the subtractor 58 (FIG. 4B), the mirror control 74 transmits a signal for changing the deflection angle of the mirror 5 to the amount of $+n$ or $-n$ tracks. In this manner, the multi-jump operation terminates while the pulse E is at the high level (FIG. 8A, block 111). After the jump, the mirror control 74 sends a signal $J_n$ indicative of the number of jumps to the error correcting circuit 50 through a line 74A, the signal being stored therein. Subsequently, an odd field address and an even field address are respectively read by the shift registers 29 and 28 (FIG. 4B) during the next one revolution (FIG. 8A, block 112). The read addresses are subjected to error checks in the error check circuit 40 (FIG. 8A, block 113). In a case where the absence of an error has been found as the result of the error checks, the operation of setting the read address $\overline{OD}'$ into the present address register 56 (FIG. 8A, block 108) is conducted. This operation is carried out as described below. The high level signal $\overline{OK}$ is entered from the error check circuit 40 into the AND gate 622 within the sequence control 60 shown in FIGS. 5A and 5B, so that when the pulse D is entered into the AND gate 622, the AND gate 622 provides a signal of high level. This output is entered into the AND gate 632. The other input terminal of the AND gate 632 receives the high level signal from the flip-flop 640 through the AND gate 642, an OR gate 644 and the OR gate 630. Accordingly, the AND gate 632 provides the high level signal AA while the signal D is entered into the AND gate 622. As already stated, the signal AA causes the present address register 56 (FIG. 4B) to store the address data $\overline{OD}'$.

When the operation of the block 108 in FIG. 8A is thus completed, the operation of the block 109 in FIG. 8A is conducted. This operation is carried out in the error correcting circuit 50 by the high level signal RG which is provided from the OR gate 666 upon receiving the high level signal from the AND gate 642.

Figure 8B:
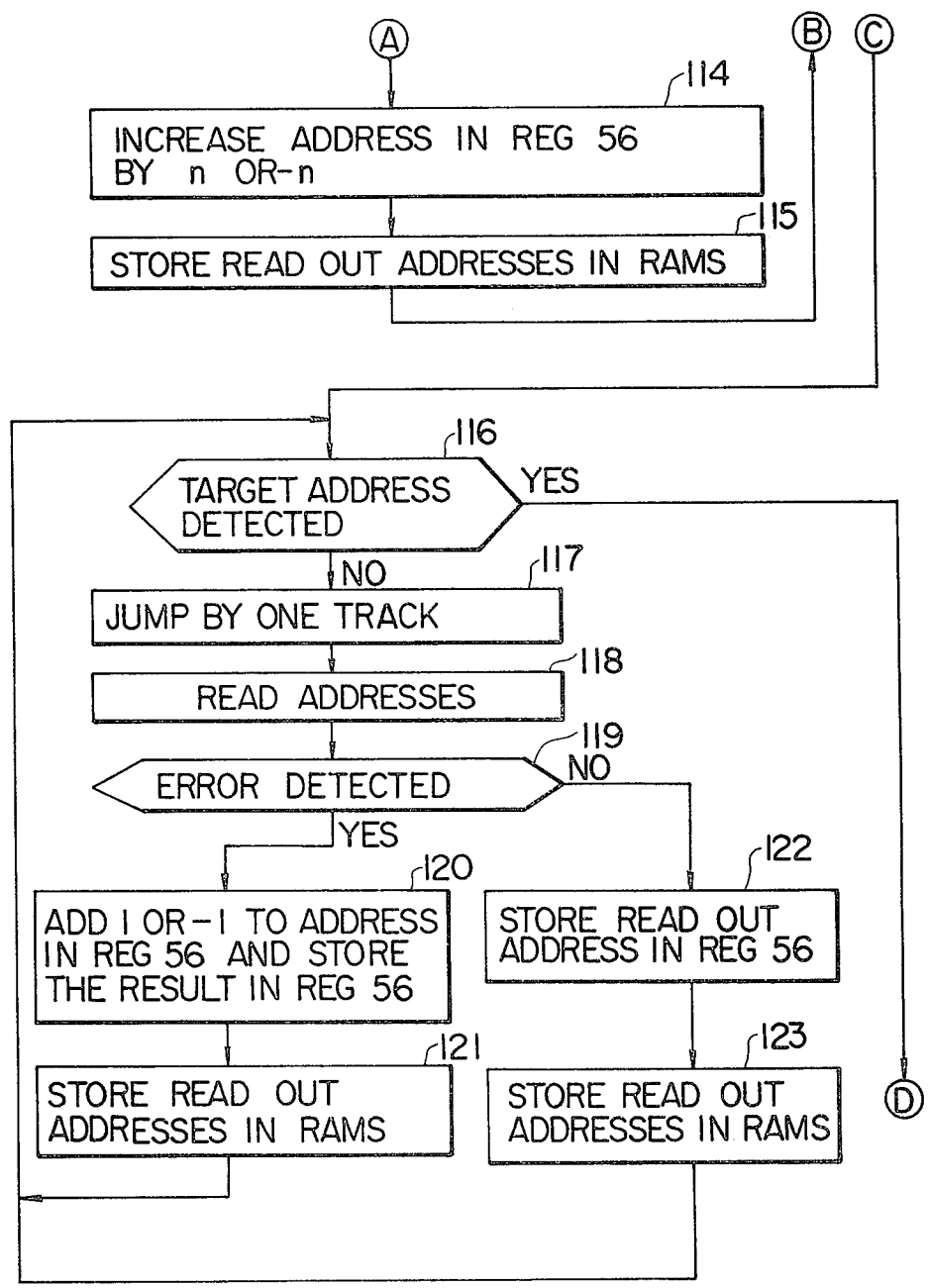

On the other hand, in the case where the presence of an error has been determined as the result of the error check in the block 113 in FIG. 8A, an operation of block 114 in FIG. 8B is conducted as described below by means of the sequence control 60 in FIGS. 5A and 5B. Since, in this case, the signal $\overline{OK}$ is not provided from the error check circuit 40, the AND gate 622 within the control 60 remains "off" and the signal AA is not delivered onto the line 60D. Instead of the signal AA, a signal of high level is provided from an AND gate 648. More specifically, an AND gate 646 is "on" because the inverted signal of the signal $\overline{OK}$ and the high level signal of the AND gate 642 given through the OR gate 644 are entered therein. The AND gate 648 turns "on" because the signal D and the high level output of the AND gate 646 are supplied thereto. Accordingly, the AND gate 648 provides the high level signal while the signal D is applied.

This high level signal starts a pulse sequence generator 652. The circuit 652 generates pulses equal in number to a value n stored in a register 654. The value n is smaller than $m_1$, and is selected to e.g. 2. The output of the circuit 652 is entered into an AND gate 656. Since the AND gate 656 is in the enabled state owing to the high level signal from the AND gate 642, it provides the entered pulses as they are. The pulse train signal is entered into the present address register 56 (FIG. 4B) through a line 60E as a signal CLK. The present address register 56 is constructed of a counter capable of counting up and down, and it counts up or counts down by n in response to the signal CLK and also to the sign signal UD entered through the line 58B from the subtracter 58 (FIG. 4B). Thus, a value of RR+n or RR−N where RR denotes the address prior to the jump is stored into the present address register 56 in correspondence with the +n or −n jump (block 114 in FIG. 8B).

After this operation, an operation in a block 115 in FIG. 8B is conducted. The operation is executed when the signal RG is at the high level and in response to this signal RG in the error correcting circuit 50, as in the case where the absence of an error has been determined in the block 113 of FIG. 8A.

After the ends of the operations of the block 109 in FIG. 8A and the block 115 in FIG. 8B, the operation of the block 110 (FIG. 8A) is executed in the sequence control in FIGS. 5A and 5B again. A difference signal Y at the time when a new address value has been set in the present address register 56 (FIG. 4B), and the value of the register 636 are compared by the comparator 634. Unless the high level signal is provided from the comparator 634, the operations of the blocks 101 to 109 or 115 are repeated. When $Y \leq m_1$ is established and the high level signal is provided from the comparator 634, an operation of block 116 is initiated.

The flip-flop 640 is reset by the high level signal from the comparator 634. As a result, an AND gate 664 which has been in the disabled state by the high level signal of the flip-flop 640 till then becomes the enabled state and delivers an output of a flip-flop 662 as it is. The flip-flop 662 is set by the output of the delay circuit 614.

The signal Y is entered into a decoder 658, the output of which is entered into the reset terminal of the flip-flop 662 through an AND gate 660. This output becomes the high level when the signal Y is equal to zero. This corresponds to the time when the target address and the value in the present address register are equal.

When the addresses are not equal, the decoder 658 provides a signal of low level, so that the flip-flop 662 is not reset. At this time, accordingly, the signal of high level is provided from the AND gate 664, and the signal SJ of high level is delivered onto the line 60C through the OR gate 628 as well as the AND gate 629. It is when the signal E is entered from the line 22E into the AND gate 629 that the signal SJ is provided. The signal SJ is sent to the mirror control 74 (FIG. 4A) through the line 60C. On the basis of the signal SJ and the sign signal UD entered from the subtracter 58 (FIG. 4B), the mirror control 74 transmits a signal to the mirror 5 in order to effect a jump of the number of track of +1 or −1. At this time, the signal $J_n$ indicative of the number of jumps is sent from the mirror control 74 through the line 74A to the error correcting circuit 50. Thus, the operation of block 117 in FIG. 8B is completed.

In the subsequent one revolution, the addresses of the track after the jump are read out again (FIG. 8B, block 118). Further, error checks are conducted on the read addresses (FIG. 8B, block 119). In the presence of an error, both the AND gates 646 and 648 turn "on" at the rise of the next timing signal D, and the signal of high level is delivered from the AND gate 648. At this time, the signal of high level is entered from the AND gate 664 into an AND gate 650. Therefore, a signal which is at the high level during the high level of the signal D is delivered from the AND gate 650 onto the line 60E as a single clock pulse CLK. On the other hand, the AND gate 656 is in the "off" state at this time because the flip-flop 640 has been reset, and it does not deliver the pulse train provided from the pulse sequence generator 652.

The signal CLK is sent to the present address register 56 (FIG. 4B) through the line 60E. The present address register 56 counts up or counts down by one in response to the signal CLK and the sign signal UD from the subtracter 58 (FIG. 4B). In this way, RR+1 or RR−1 relative to the value RR previous to the jump is stored in the present address register 56, and the operation of block 120 is effected. Thereafter, there is a shift of operation to block 121 (FIG. 8B). The error correcting circuit 50 executes this operation by receiving the high level signal RC which is delivered from the flip-flop 662 onto the line 60H through the AND gate 664, OR gate 628 and OR gate 666.

In a case where the absence of an error has been determined in the operation of the block 119 (FIG. 8B), that is, the signal $\overline{OK}$ has been provided on the line 40A, the signal AA is delivered onto the line 60D to set the signal $\overline{OD}'$ on the line 40C into the present address register 56 (FIG. 8B, block 122). Further, the error correcting circuit 50 stores the signals $\overline{OK}$, $\overline{OD}$ and EV on the lines 40A, 40B and 40D by the signal RG (FIG. 8B, block 123).

Thereafter, there is a shift of operation to the block 116 shifted to. Until the arrival at the target address is detected, the operations of the blocks 116–121 or the blocks 116–123 are repeated. Upon detecting that the target address has been reached, the decoder 658 provides the high level signal to reset the flip-flop 662.

A flip-flop 674 has been already reset when the output of the delay circuit 614 has been entered into its reset terminal through an OR gate 672. When the AND gate 660 provides a high level, the flip-flop 674 is set by the high level signal. As a result, a signal RP of high level is delivered onto a line 60I. A signal PP of high level is delivered onto a line 60J from an AND gate 676 when both the signals D and OK are at the high level. In consequence, processings of and after the next block 124 are executed by the error correcting circuit 50. These processings and the processings of the blocks 109, 115, 121 and 123, the detailed descriptions of which have been omitted, will now be described with reference to FIG. 7.

FIG. 7 shows the error correcting circuit 50 which is constructed with a micro-processor of one chip. A micro-computer system 250 consists of a micro-processor 251 (for example, "i8080 type" of Inter Inc.), an I/O bus control 252 which controls the transfer of data between an input/output (I/O) bus 250A and the micro-processor 251, a status control 253 which decodes the status of the micro-processor 251 and which controls the I/O bus controls 252, an interrupt control 254 which controls an interrupt to the micro-processor 251 on the basis of an interrupt signal entered through an interrupt bus 257A, a clock signal generator 255 which determines the machine cycle of the micro-processor 251, and a main memory 256. The main memory 256 has a read only memory (ROM) for storing a control program, and a random access memory (RAM) for storing input and output data for operations etc. The execution of the control program is achieved by sending an instruction to-be-executed to a decoder 261 through the I/O bus 250A.

Bus drivers 257, 258 and 259 for interrupt levels 3, 2 and 1 respectively are connected to the interrupt bus 257A. As the interrupt level is lower, the priority of the interrupt is higher. Random access memories 277, 278 and 279 store therein the address data OD and EV delivered from the error check circuit 40 and the mirror jump number $J_n$ delivered from the mirror control 74, respectively. The storage addresses of the data into the random access memories are supplied by a program counter 266. The stored data are employed for the correction of an address signal having an error. A counter 288 serves to count the number of times by which the load of the addresses of tracks is repeated after detecting the target address.

Execution programs of the micro-computer system 250 are classified into two sorts. They are selected depending upon the interrupt level which are respectively entered into the bus drivers 257, 258 and 259. When the signal D is entered into the bus driver 259, the micro-processor 251 stores therein outputs FLG of the flip-flops 618, 620, 640, 662 and 674 (FIG. 5A) and discriminates what operation in the flow of FIGS. 8A, 8B and 8C is presently being executed. When an overflow signal P of the counter 288 is entered into the bus driver 258, a test for affirming the target address (FIG. 8C, block 125) is started. When the signal PP is entered into the bus driver 257, an operation for affirming the address error correction (FIG. 8C, block 126) is started.

First, storing data into the random access memories 277-279 will be described. It corresponds to the operations of the blocks 109, 115, 121 and 123 in the flow chart of FIGS. 8A and 8B. When, under the condition in which neither of the signals P and PP is entered, the fast drive signal J is delivered from the sequence control 60 onto the line 60G, this signal J is entered into the reset terminal R of the program counter 266 through the OR gate 275, to reset the program counter 266 to zero. Thereafter, when the fast drive ends and the signal D is entered in the state under which the signal RG requesting the storage of data into the correcting memories 277, 278 and 279 is entered, an AND gate 271 is enabled and the signal D is entered into the write terminals WE of the memories 277, 278 and 279 through a NOR gate 270. Simultaneously, the output of the NOR gate 270 is entered into the trigger terminal T of the program counter 266. Accordingly, the memories 277, 278 and 279 store the signals OD, EV and $J_n$ into the addresses indicated by the program counter 266 and at the time of the fall of the signal D, respectively. At the fall of the signal D, the program counter 266 simultaneously counts up. In this manner, each time the signal D is applied, the memories 277, 278 and 279 store the data.

Thereafter, when it is detected by the test of the block 116 in FIG. 8B that the target address has been registered in the present address register 56 (FIG. 4B), the signal RG becomes the low level as already stated. In consequence of the low level of the signal, RG, the gate 271 turns "off," and the signal D is not sent to write terminals of the memories 277–279, so that the writing of data is not carried out.

Each time the signal D is entered through the line 22D from the timing signal generator 22 and via the bus driver 259, the micro-processor 251 transmits to the decoder 261 through the I/O bus 250A an instruction for fetching the outputs FLG of the flip-flops 618, 620, 640, 662 and 674 in the sequence controller 60 onto the I/O bus 250A through the line 60L and via an AND gate 268. From the fetched output of the flip-flop, it discriminates which of the operations in the operations in the operation flow in FIGS. 8A, 8B and 8C is now being executed.

Accordingly, at the time when the signal RG has become the low level, the micro-processor knows from the signal FLG that the processing of the block 116 in FIG. 8B has ended. At this time, the micro-processor 251 executes an instruction of storing the content j of the program counter 266 into the main memory 256 through an AND gate 263. Further, after the execution of this instruction, it executes an instruction for storing the content RR of the present address register 56 (FIG. 4B) into the main memory 256 through the line 56A and an AND gate 267. Thereafter, the error correcting circuit 50 conducts the operations of and subsequent to the block 124 in FIG. 8C.

At the time when the signal RG has become the low level, it is tested to determine whether an error has been detected (block 124). When the absence of an error is consequently detected and the output $\overline{OK}$ of the error check circuit 40 is at the high level, the signal PP of high level is provided from the AND gate 676 in the sequence control 60 in FIG. 5B at the time at which the signal D has become the high level. This signal PP is entered into the micro-computer system 250 through the line 60J, bus driver 257 and interrupt bus 257A. Upon receiving this signal, the micro-computer system 250 executes the next test for affirming the target address (block 125 in FIG. 8C).

Figure 9:
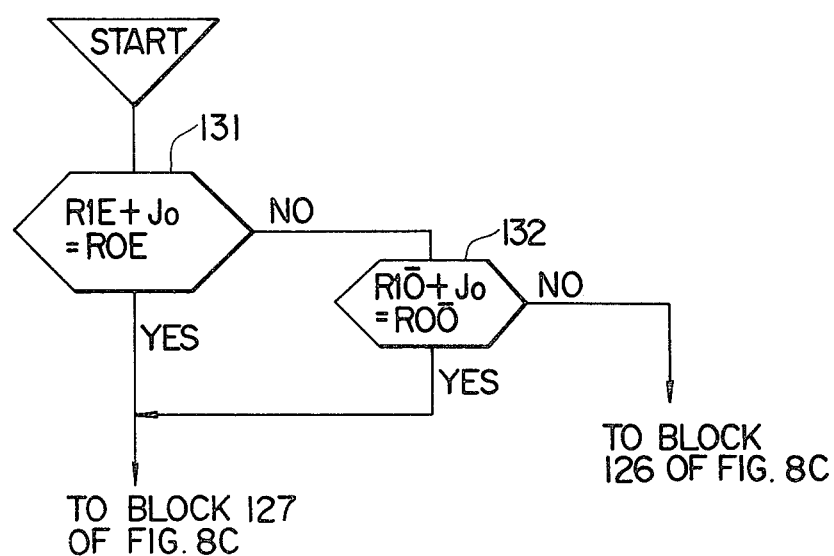
FIG. 9 is a flow chart showing the details of a test in a block 125 in FIG. 8C.

The affirming test is illustrated in FIG. 9. In block 131, it is checked to determine whether or not the sum between data R1E concerning the track read out immediately before the present track, among data EV in the memory 278 and the number of tracks $J_O$ by which the light beam has jumped in order to arrive at the present track from the preceding track, among data $J_n$ in the memory 279 is equal to data ROE concerning the present track among the data EV in the memory 278.

To this end, the micro-computer system 250 transmits onto the bus 250A an instruction for reading out the data R1E in the memory 278 and an address at that time. When the decoder 261 has decoded this read instruction, it transmits a signal for enabling an AND gate 262 and a signal (not shown) for setting in the program counter 266 an address signal fed from the AND gate 262. Further, an AND gate 265 is enabled by the output of the decoder 261, and the data R1E read out from the memory 278 by the address signal being the output of the program counter 266 is loaded into the main memory 256. Thereafter, the data ROE is similarly loaded from the memory 277 into the main memory 256 through a gate 264. Thereafter, the data $J_o$ is similarly loaded from the memory 279 into the main memory 256 through a gate 266.

With these data, a check is made of whether or not R1E+$J_o$ and ROE are equal. When it is decided by the check that they are not equal, a processing of block 132 (FIG. 9) is executed. That is, it is checked whether or not the sum between the data R10 concerning the track read out immediately before the present track, among the data $\overline{OD}$ in the memory 277 and the number of tracks $J_O$ by which the light beam has jumped in order to arrive at the present track from the preceding track, among the data $J_n$ in the memory 279 is equal to data ROO concerning the present track among the data OD in the memory 277. When, as the result of the tests in the blocks 131 and 132 (FIG. 9), it has been found that either test holds, the operation of the block 127 in FIG. 8C is carried out. More specifically, when either test holds as the result of the affirmation, the micro-processor 251 transmits to the I/O bus 250A an instruction permitting the video display of the track being presently read out. A permission signal CR obtained by decoding the permission instruction from the decoder 261 is sent to the reset terminal of the flip-flop 608 in the sequence control 60 (FIG. 5B) through the line 50B and resets the flip-flop. In consequence of the resetting of the flip-flop 608, the video switch 14 (FIG. 4A) sends the output of the FM demodulator 12 to the CRT display device 16 and allows the video display.

Figure 8C:
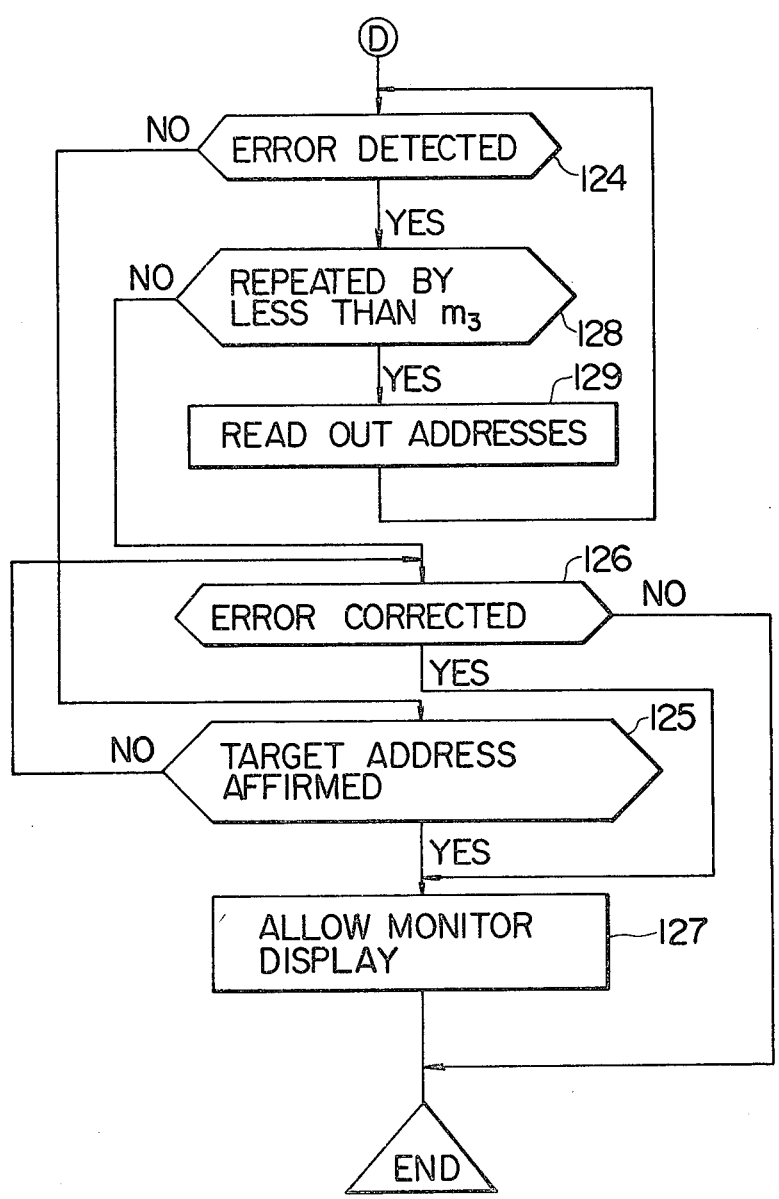

When, as the result of the test in the block 132 (FIG. 9), it has been found that either test does not hold, the operation of the block 126 in FIG. 8C is executed.

By the affirmation according to FIG. 9 as above described, the error check of extraordinarily high likelihood is effected.

During the above processings, the signal OK is kept entered into the reset terminal of the counter 288 through the AND gate 285 and the OR gate 287, and hence the counter remains reset. The signal RP of high level is kept entered into the gate 285. On the other hand, when the presence of an error is determined at the time at which the signal RG has become the low level (FIG. 8C, block 124) and the output $\overline{OK}$ of the error check circuit 40 is at the low level, the signal PP is not transmitted. Since the signal $\overline{OK}$ is at the low level, the counter 288 is not reset. The counter 288 counts up when the signal D received through the gate 286 has turned from the high level to the low level. The addresses of the same track are repeatedly read out (FIG. 8C, block 129), the error check (FIG. 8C, block 124) is effected, and the read operation is repeated unless the absence of an error is reached.

Figure 10:
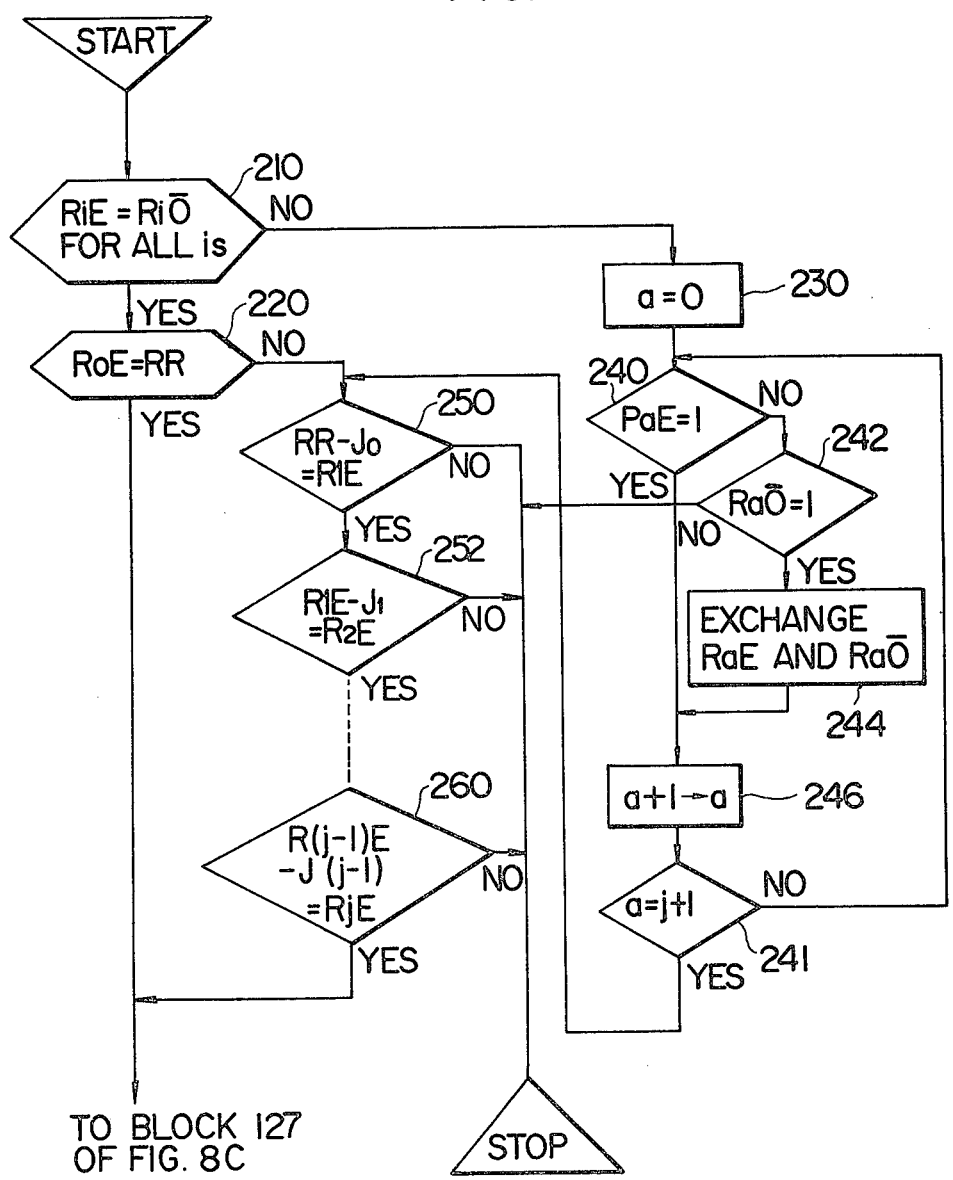
FIG. 10 is a flow chart showing the details of a test in a block 126 in FIG. 8C, FIGS. 11A, 11B and 11C are flow charts showing the flow of operations of a second embodiment of this invention.

A test is made every repetition whether or not the number of repetitions has arrived at a predetermined value ($m_3$) (for example, 8 to 16) (FIG. 8C, block 128). Upon detecting the arrival at the predetermined value, the counter 288 overflows to provide the signal P. The signal P resets the flip-flop 674 in the sequence control 60 (FIG. 5A) through the line 50A and the gate 672 (FIG. 5A). As a result, the flip-flop 674 does not provide the signal RP. On the other hand, the signal P is sent to the micro-computer system 250 through the bus driver 258. Upon receiving this signal, the micro-computer system 250 initiates the error correction affirming operation (block 126, FIG. 8C). The details of the error correction affirming operation are as illustrated in FIG. 10.

While referring to j already stored in the main memory 256, data $Ri\overline{O}$ in the memory 277 concerning a track i steps before the present track and data RiE in the memory 278 are read in succession so as to detect their coincidence, and this is done for all i's (i=0 to j) (block 210). When, as the result of the comparison, the coincidence has been found for all i's, the coincidence between ROE and the data RR in the present address register 56 (FIG. 4B) is detected (block 220). The data RR is stored into the main memory 256 through the line 56A and the AND gate 267. When, as the result of the comparison, the coincidence has been found, the operation of block 127 in FIG. 8C is carried out.

When, as the result of the coincidence detection in the block 210, the coincidence has not been found for all i's, a constant a is made zero as indicated in block 230, whereupon a test in block 240 is executed. That is, it is checked whether or not a bit representative of the result of the parity check (the bit being denoted by PaE) among the address data EV in the memory 278 concerning the track read out a steps before the present track is "1" (block 240). PaE=0 corresponds to a case where a parity error exists as the result of the parity check. At this time, there is a shift of operation to block 242. In this block 242, it is checked whether or not a bit representative of the result of the parity check (the bit being denoted by $Pa\overline{O}$) among the address data $\overline{OD}$ in the memory 277 concerning the track read out a steps before the present track is "1." When, as the result of the checks, PaE=0 and $Pa\overline{O}$=1 have been found, RaE and $Ra\overline{O}$ are exchanged (block 244). As indicated in blocks 246 and 241, this is repeated till a=j. In this way, data having no parity error are stored at least in the memory 278. However, if $Pa\overline{O}$="0" as the result of the test of the block 242, the presence of an address error is determined, and the random access operation is stopped without transmitting onto the line 50B the signal CR allowing the video display.

However, in case where at least one of PaE and PoE has been "1" till a=j in the block 241, an operation of block 250 is conducted. The operation of the block 250 is also conducted when ROE≠RR has been determined in the block 220. In blocks 250-260, whether or not RR−$J_0$=R1E, R1E−$J_1$=R2E, . . . and (j−1)E−J(j−1)=RjE are successively compared. If, as the result of the comparisons in the block 250-260, non-coincidence is found in any comparison, the presence of an error is determined and the monitor display is kept prohibited. In case where all the comparisons are found coincident, the operation of the block 127 in FIG. 8C is conducted.

In the manner described above, the detection of the target address which is extraordinary high in reliability becomes possible.

In the above explanation, a control signal MS to the gate 26 for controlling the load of the addresses into the shift registers 28 and 29 is delivered onto a line 60F from an OR gate 670 in the sequence control (FIG. 5B).

Inputs to the OR gate 670 are the output of the AND gate 642 and an output of an OR gate 668. Inputs to the OR gates 668 are the output of the flip-flop 674 and the output of the OR gate 628.

In the flow chart of FIG. 8C, it is also possible to omit the operation of the block 125 and to execute the operation of the block 127 immediately after the decision of "No" by the operation of the block 124.

The embodiment above described is a high reliability check type random access system for a video information file. For the sake of convenience of the automatic correction of the address error at the termination of the access and the affirmation of the addresses at the termination of the access as are the characterizing features, the addresses are loaded, the error is checked and the read addresses are registered in the error correcting registers every access jump of the tracking mirror. Such a technique can be said to be the result of pursuing the likelihood (reliability) even if the characteristic of the multi-jump is sacrificed to some extent. In this regard, in a method, at the time when the reference address after the fast drive movement has been completed, the jump is made to the target address by executing one multi-jump, and only in case where the address gives rise to an error, addresses in the surroundings are loaded, whereby the address error is automatically corrected. This method is effective for shortening the access time without greatly damaging the reliability in comparison with the foregoing embodiment.

Figure 11A:
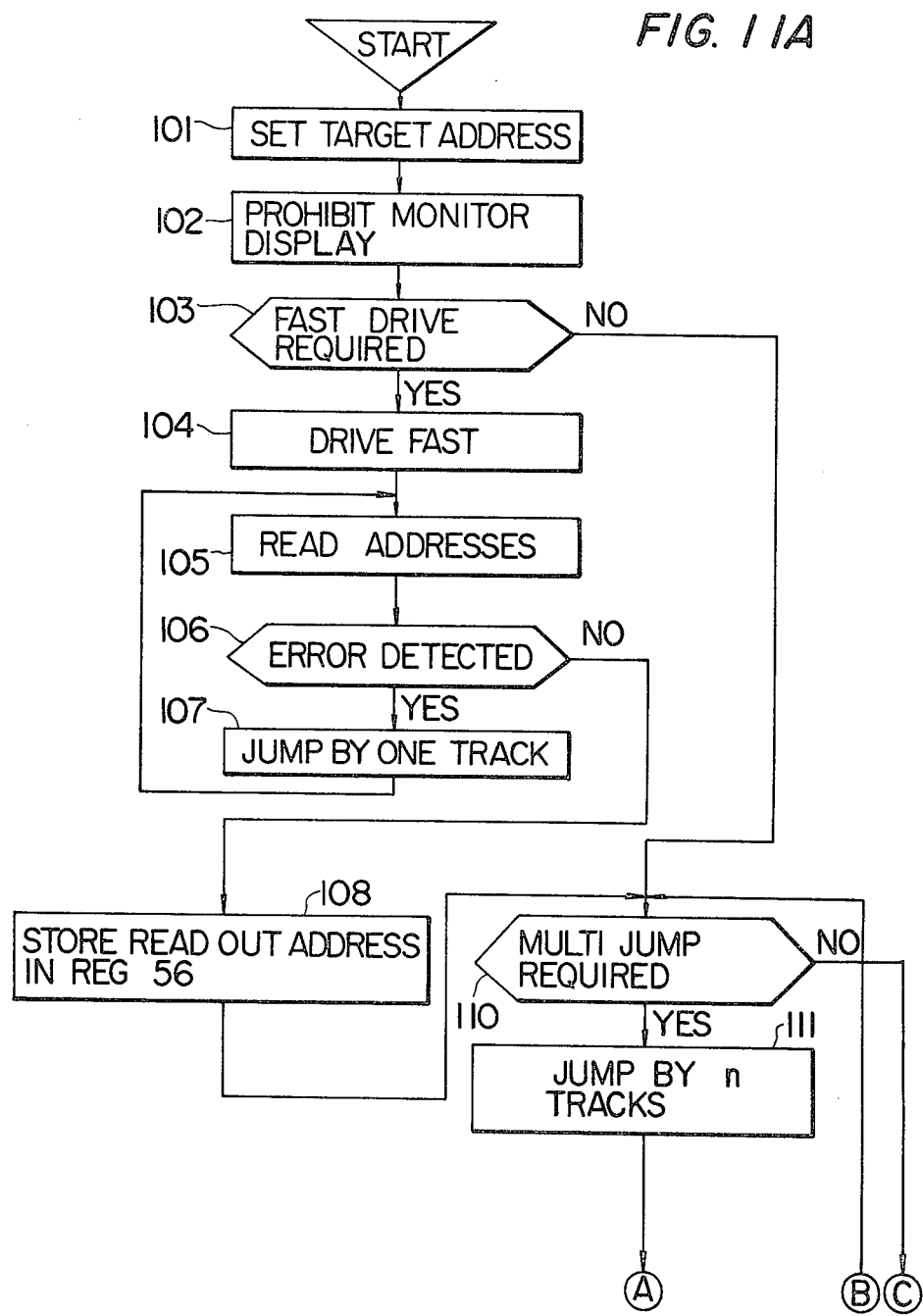
Figure 11B:
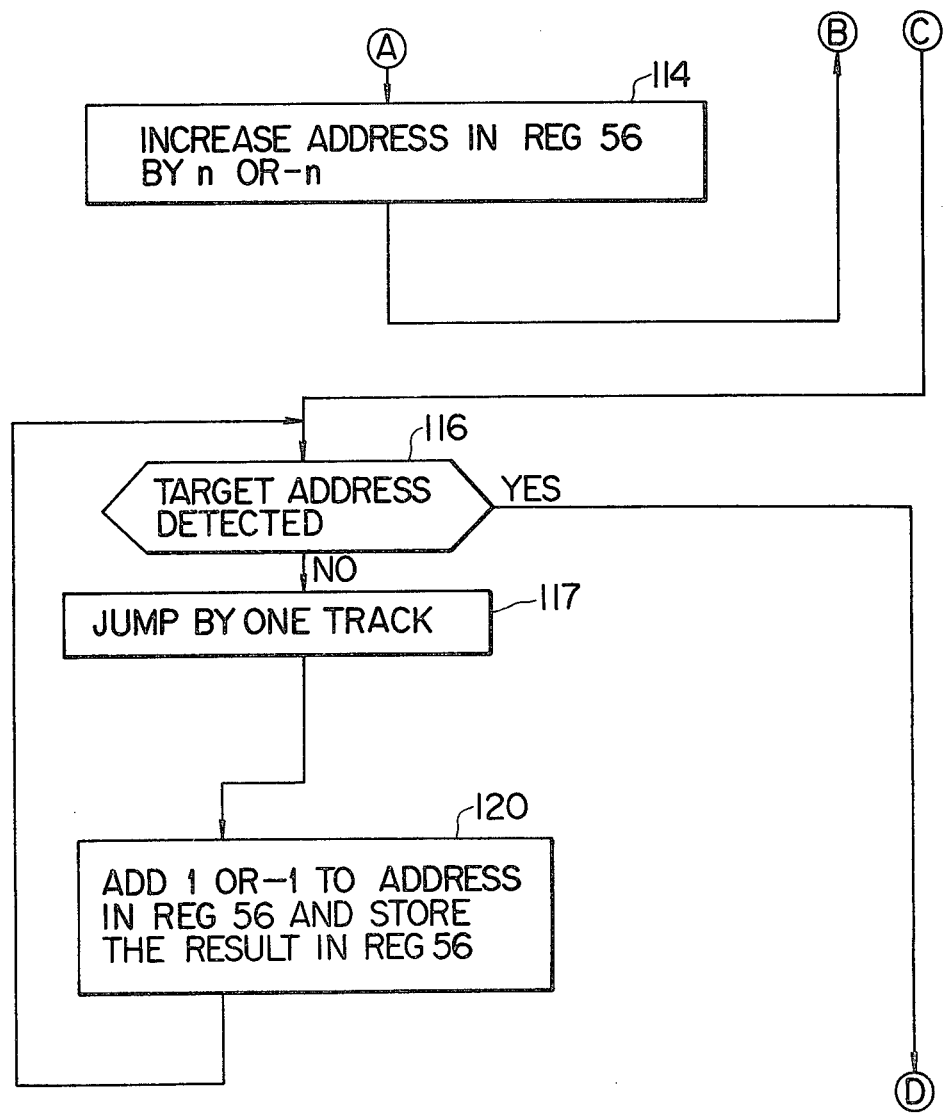

FIGS. 11A, 11B and 11C illustrate a flow chart of a second embodiment of this invention. Blocks of the same numerals as in FIGS. 8A, 8B and 8C represent the same operations. Differences of the flow in FIGS. 11A, 11B and 11C from the flow in FIGS. 8A, 8B and 8C are as follows:

(1) The block 109 in FIG. 8A and the blocks 115, 121 and 123 in FIG. 8B are not included.
(2) The blocks 112 and 113 in FIG. 8A are not included, and the operation of the block 114 is conducted without executing the error decision in the processing.
(3) The blocks 118 and 119 in FIG. 8B are not included, and the operation of the block 120 is conducted without executing the error decision in the processing.
(4) The block 125 in FIG. 8C is not included, and the monitor display is permitted without the affirmation.
(5) The processings of and after the block 128 in FIG. 8C vary from the processings of and after block 128 in FIG. 11C.

Figure 12A:
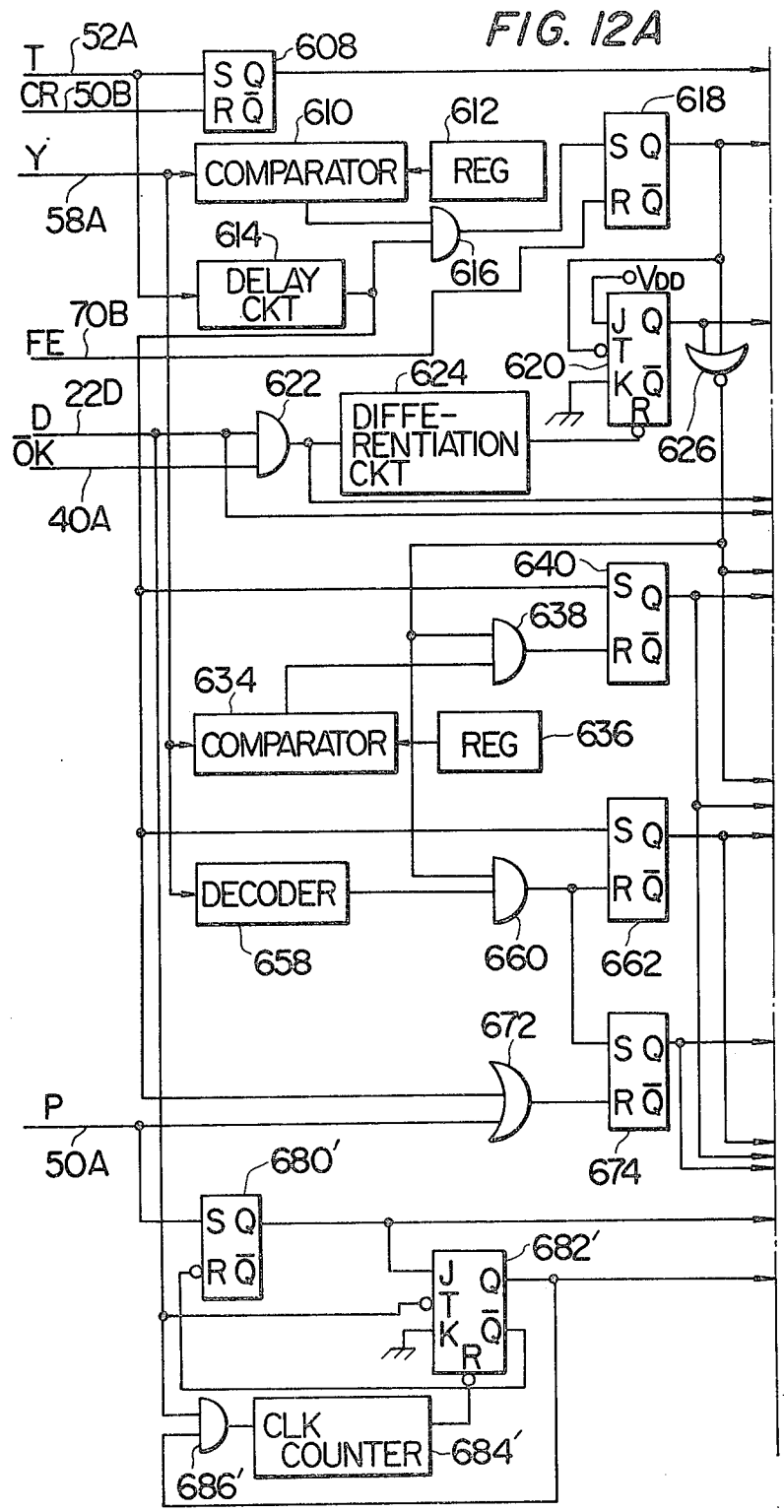

FIGS. 12A and 12B are diagrams of a logical circuit of the sequence control 60 for performing the flow in FIGS. 11A, 11B and 11C. The illustrated parts are arrayed as shown in FIG. 12C. In the figures, elements with primed reference numerals are disposed anew. Components having the same reference numerals as in FIGS. 5A and 5B are quite identical to the corresponding elements in FIGS. 5A and 5B. Signals designated by the same symbols as in FIGS. 5A and 5B are signals for carrying out the same controls as those of the corresponding signals in FIGS. 5A and 5B.

Owing to Item (1) mentioned above, unlike the signal RG in FIG. 5B, the signal RG in FIGS. 12A and 12B is generated only in the operations of and subsequent to the operation of the block 128 (FIG. 11C).

In correspondence with Item (4), the circuit in FIGS. 12A and 12B does not include any circuit for generating the signal PP in FIG. 5B. In FIGS. 12A and 12B, accordingly, the bus driver 257 (FIG. 7) is unnecessary for the error correcting circuit 50.

In correspondence with Item (5), the circuit of FIGS. 12A and 12B is provided with an R-S flip-flop 680' for a flag of multi-jump request in the vicinity of a stop position, a J-K flip-flop 682' for a flag of request for return to the stop position, a counter 684' for counting the number of returns, and an AND gate 686'. Of course, in correspondence with Items (2) or (3), circuits for generating signals AA and CLK in FIGS. 12A and 12B are different from those in FIGS. 5A and 5B. Since, however, the details are apparent from the circuit diagrams and the following description of operations, the explanation is omitted.

Hereunder, the flow charts of FIGS. 11A, 11B and 11C will be described with reference to FIGS. 12A and 12B and with emphasis on its differences from the flow chart of FIGS. 8A, 8B and 8C. If passed through the error check in the block 106 (FIG. 11A), a loaded address is stored into the present address register 56 as the reference address after the fast drive (block 108), and it becomes an input to the multi-jump determining block 110. The data $m_1$ of the register 636 (FIG. 12A) for the multi-jump determination is fixed to 2. If the difference Y is equal to or greater than $m_1$, the multi-jump (+n or −n tracks) is executed (block 111). Immediately, the number of the multi-jump is added to the content RR of the present address register 56 (FIG. 4B), the result is stored in the register 56 again (block 114 in FIG. 11A), and the multi-jump determination (block 110 in FIG. 11A) is returned to. At this time, the value n of the register 654 (FIG. 12B) is selected at 2. When it has been determined in the block 110 that the multi-jump is unnecessary (i.e., in case where the error between the value of the present address register 56 and the target value is ±1 or 0 address because $m_1$=2), the judgement of arrival at the target address in the block 116 of FIG. 11B is made. If the error if ±1 address exists, the single jump of +1 or −1 in the block 117 is executed. Immediately the value of RR+1 or RR−1 is stored into the present address register 56 (block 120), whereupon the block 116 is returned to. When the arrival at the target address has been decided by the determination of the block 116 (at this time, the present address usually indicates a predicted address), the parity bit is checked for each of the odd field address and the even field address, and the coincidence of both the address is checked (block 124 in FIG. 11C). If the addresses are coincident, it is judged that the content RR of the present address register 56 is the normal value, the video display is made on the monitor TV screen (block 127), and the random access operation is completed. When an address error has been judged in the error check (block 124), a loop of block 124 →block 128→block 129 is executed $m_3$ times by the error correcting circuit 50. Only in case where the address error still arises, addresses near the final address are registered in the RAM's (FIG. 7). More specifically, when the number of repeated checks after the stop of the access is greater than $m_3$, the counter 288 (FIG. 7) in the error correcting circuit 50 overflows to provide the signal P. The flip-flop 680' for the multi-jump request flag is set by the rise of the signal P, and it delivers a multi-jump command U' to the mirror control 74 through a line 60M (which is not shown in FIG. 4). At this time, the signal MJ is delivered to the mirror control 74 through the OR gate 667+, AND gate 627 and line 60B. The mirror control 74 is so constructed as to effect a jump of the number of tracks $-J_m$ ($J_m=5$ to 10) when both the signals U' and MJ are received.

Thus, the multi-jump is continuously executed by $-J_m$ (block 138). At this time, the high level output U' of the flip-flop 680' is transmitted onto a line 60F through OR gates 667' and 670. The signal MS on the line 60F is sent to the AND gate 26 (FIG. 4B), and allows the shift registers 28 and 29 to load address signals of a new track to be jumped thereto. Thus, the new addresses are loaded after one revolution of the disk (block 150). Also, the high level output U' of the flip-flop 680' is sent onto a line 60H through the OR gate 666'. The signal RG on the line 60H is sent to the error correcting circuit 50, and instructs it to load the read address signals into the correcting memories 277 and 278. Thus, the operation of the block 151 is executed. At this time, the content of the flip-flop 680' is shifted to the flip-flop 682' by the fall of the pulse D, to set the flip-flop 682'. When the flip-flop 682' is set, the fall of an output from its terminal $\overline{Q}$ resets the flip-flop 680'.

An output U" of the flip-flop 682' is sent to the mirror control 74 through a line 60N (which is not shown in FIGS. 4A and 4B). At this time, the signal U" is delivered onto the line 60C through the OR gate 630' and the AND gate 629. The signal SJ on the line 60C is sent to the mirror control 74.

The mirror control 74 is so constructed as to effect a jump of one track in the direction opposite to the jumping direction of $-J_m$ upon receiving the signals U" and SJ. Thus, the operation of the block 153 is executed.

The signal U" is sent onto the line 60F through the OR gates 668' and 670. The signal MS on the line 60F instructs the shift registers 28 and 29 (FIG. 4B) to load the addresses. In this way, after one revolution, the addresses of the track after the new jump are loaded into the RAM's 277 and 278 in the error correcting circuit 50. At this time, the jump number signal $J_m$ from the mirror/control is loaded into the RAM 297.

Thus, the operation of the block 150 is carried out. Thereafter, the operations of the blocks 151, 153 and 150 are repeated $J_m$ times. When the number of there is a shift of repetitions exceeds $J_m$, the operation to the block 126. The check as to whether the number of repetitions has exceeded $J_m$ or not is carried out by the counter 684'. That is, each time the pulse D is entered after the flip-flop 682' has been set, the AND gate 686' is enabled and the counter 684' counts up by one.

When, after the $J_m$-th signal D has been entered and accordingly the $J_m$-th+1-jump has been executed in the manner described above, the ($J_m$+1)-th signal D is entered, the counter 684' overflows and provides "1" at the rise of the signal D. Thus, the flip-flop 682' is reset. Consequently, the signal U" is no longer provided, and the +1-jump is ceased. The error correcting circuit 50 monitors the outputs of the flip-flops 680' and 682' through a line L'. When the output of the flip-flop 682' has turned from the high level to the low level, the error correcting routine 126 is executed.

In the manner set forth above, the detection of addresses can be effected precisely and at high speed. This invention is not restricted to the foregoing embodiments, but it covers various modifications readily suggestible by one skilled in the art within the scope of the appended claims.

We claim:

1. A random access storage apparatus comprising:
   a rotary recording medium having a plurality of signal recording tracks formed thereon, each track having an identifier number recorded thereon for identifying a signal recorded thereon;
   reading means for detecting signals from the respective tracks, said reading means being disposed in opposition to the surface of said recording medium and in non-contacting relation therewith for selectively detecting a signal from one of the plurality of tracks opposite thereto;
   entering means for entering the identifier number of a signal to be read out by said reading means;
   moving means responsive to the entered identifier number for moving said reading means relative to said recording medium to a position proximate to the track having the entered identifier number;
   number detecting means coupled with said reading means for detecting from the signal read out by said reading means the identifier number in the signal;
   first storage means coupled with said number detecting means for storing the detected identifier number;
   error detecting means coupled with said first storage means for detecting whether or not the stored content thereof has an error and for providing an error indicative signal or a normal indicative signal in accordance with the detection;
   first output means coupled with said error detecting means for providing a signal to said reading means for unconditionally changing the track to-be-read by a predetermined number of tracks when said error detecting means provides an error indicative signal in response to the identifier number being read for the first time after said reading means has been moved by said moving means, said first output means repeated providing the track changing signal until said error detecting means provides the normal indicative signal;
   difference means coupled with said error detecting means for detecting a difference between the content of said first storage means and the entered identifier number when said error detecting means has provided the normal indicative signal for the first time; and
   second outmeans coupled with said difference detecting means for providing a signal to said reading means for sequentially changing the track to-be-read to adjacent tracks in a direction in which the detected difference decreases.

2. A randon access storage apparatus according to claim 1, wherein said difference detecting means includes:
   second storage means coupled with said entering means for storing the entered identifier number;
   third storage means coupled with said first storage means;
   transfer means coupled with said error detecting means for transferring the content of said first storage means to said third storage means in response to the normal indicative signal provided by said error detecting means after completion of the movement of said reading means by said moving means; and
   subtractor means for detecting a difference between the contents of said second and third storage means and providing a signal indicative thereof.

3. A random access storage apparatus according to claim 2, wherein said transfer means transfers the content of said first storage means to said third storage means in response to respective normal indicative signals from said error detecting means indicating that the respective identifier numbers of the respective tracks read out after completion of movement of said reading means by said moving means are normal, and wherein said second output means includes;

generating means for generating signals equal in number to the changes of the track to-be-read, in response to the error indicative signals from said error detecting means after the track to-be-read has been changed; and varying means for varying the content of said third storage means by the number of changes in response to the changed number signals generated by said generating means.

4. A random access storage apparatus according to claim 3, wherein said second output means further includes:

zero detecting means coupled with said difference detecting means for detecting whether or not the difference is zero and providing a detection signal indicative thereof;

fourth storage means coupled with said zero detecting means for storing the output of said signal of said error detecting means and the identifier number in said first storage means in response to a detection signal indicating that the difference is not zero; and comparing means with said zero detecting means and said error detecting means for comparing the plurality of identifier numbers in said fourth storage means in response to the error indicative signal and to a detection signal indicating that the difference is zero.

5. A random access storage apparatus according to claim 2, wherein said transfer means transfers the content of said first storage means to said third storage means in response to a first normal indicative signal provided by said error detecting means after completion of the movement of said reading means by said moving means, and wherein said second output means includes:

generating means for generating signals equal in number to the changes of the track to-be-read, irrespective of the signal by said error detecting means after the read track has been changed; and varying means for varying the content of said third storage means by the number of changes in response to the signals equal in number to the changes generated by said generating means.

6. A random access storage apparatus according to claim 5, wherein said second output means further includes:

zero detecting means coupled with said difference detecting means for detecting whether or not the difference is zero and providing an output signal indicative thereof;

third output means coupled with said zero detecting means and said error detecting means for providing a signal for chaning the track to-be-read to an adjacent track by a predetermined number, in response to the error indicative signal and an output signal indicating that the difference is zero;

signal means for generating a signal for chaning the track to-be-read sequentially to the track before the changes after the chaining of the predetermined number of tracks;

fourth storage means for storing the content of said first storage means and the output signal of said error detecting means during the sequential changes of the track to-be-read; and means for comparing the contents of said fourth storage means.

7. A random access storage apparatus according to claim 1, wherein the tracks are distributed in a rotational direction of said rotary recording medium and are arranged substantially in parallel with one another, said moving means including motor means for moving said reading means in parallel with said recording medium.

* * * * *